US008286328B2

(12) United States Patent
Pinel et al.

(10) Patent No.: US 8,286,328 B2
(45) Date of Patent: Oct. 16, 2012

(54) METHOD OF FABRICATING A MODULE, FOR MILLIMETER WAVE MULTI-GIGABIT WIRELESS SYSTEMS

(75) Inventors: Stephane Pinel, Atlanta, GA (US); Joy Laskar, Marietta, GA (US)

(73) Assignee: Georgia Tech Research Corporation

( * ) Notice: Subject to any disclaimer, the term of this patent is extended or adjusted under 35 U.S.C. 154(b) by 0 days.

(21) Appl. No.: 12/984,035

(22) Filed: Jan. 4, 2011

(65) Prior Publication Data

US 2011/0120628 A1 May 26, 2011

Related U.S. Application Data

(62) Division of application No. 11/394,498, filed on Mar. 31, 2006, now Pat. No. 7,864,113.

(60) Provisional application No. 60/666,839, filed on Mar. 31, 2005, provisional application No. 60/666,840, filed on Mar. 31, 2005, provisional application No. 60/667,287, filed on Apr. 1, 2005, provisional application No. 60/667,312, filed on Apr. 1, 2005, provisional application No. 60/667,313, filed on Apr. 1, 2005, provisional application No. 60/667,375, filed on Apr. 1, 2005, provisional application No. 60/667,443, filed on Apr. 1, 2005, provisional application No. 60/667,458, filed on Apr. 1, 2005.

(51) Int. Cl.
*H01S 4/00* (2006.01)

(52) U.S. Cl. ............ 29/592.1; 29/832; 29/852; 29/600; 343/700 MS

(58) Field of Classification Search ............ 29/830–832, 29/833–834, 600, 592.1; 343/700 MS, 853, 343/893, 846, 912
See application file for complete search history.

(56) References Cited

U.S. PATENT DOCUMENTS

| | | | |
|---|---|---|---|
| 5,552,798 | A | 9/1996 | Dietrich et al. |
| 5,888,627 | A | 3/1999 | Nakatani |
| 6,028,489 | A | 2/2000 | Juang et al. |

(Continued)

FOREIGN PATENT DOCUMENTS

| | | |
|---|---|---|
| JP | 08181452 A | 7/1996 |

(Continued)

OTHER PUBLICATIONS

Murakami, Yasushi et al., "A Switchable Multi-Sector Antenna for Indoor Wireless LAN Systems in the 60-GHz Band", IEEE Transactions on Microwave Theory and Techniques, vol. 46, No. 6, Jun. 1998, pp. 841-843.

(Continued)

*Primary Examiner* — Minh Trinh
(74) *Attorney, Agent, or Firm* — Ryan A. Schneider, Esq.; Troutman Sanders LLP

(57) ABSTRACT

A method of fabricating an ultra-high frequency module is disclosed. The method includes providing a top layer; drilling the top layer; milling the top layer; providing a bottom; milling the bottom layer to define a bottom layer cavity; aligning the top layer and the bottom layer; and adhering the top layer to the bottom layer. The present invention also includes an ultra-high frequency module operating at ultra-high speeds having a top layer, the top layer defining a top layer cavity; a bottom layer, the bottom layer defining a bottom layer cavity; and an adhesive adhering both the top layer to the bottom layer, wherein the top layer and the bottom layer are formed from a large area panel of a printed circuit board.

7 Claims, 25 Drawing Sheets

U.S. PATENT DOCUMENTS

| | | | |
|---|---|---|---|
| 6,091,364 | A | 7/2000 | Murakami et al. |
| 6,091,373 | A | 7/2000 | Raguenet |
| 6,147,648 | A | 11/2000 | Granholm et al. |
| 6,275,191 | B1 | 8/2001 | Lesea et al. |
| 6,320,543 | B1 | 11/2001 | Ohata et al. |
| 6,384,785 | B1 | 5/2002 | Kamogawa et al. |
| 6,808,642 | B2 * | 10/2004 | Takaya et al. .................. 29/846 |
| 6,821,819 | B1 * | 11/2004 | Benavides et al. ............ 438/122 |
| 6,836,247 | B2 | 12/2004 | Soutiaguine et al. |
| 6,975,276 | B2 | 12/2005 | Brown |
| 6,982,480 | B2 | 1/2006 | Shi |
| 7,295,161 | B2 | 11/2007 | Gaucher et al. |
| 7,358,604 | B2 | 4/2008 | Heyen et al. |
| 7,864,113 | B2 | 1/2011 | Pinel et al. |
| 2002/0158722 | A1 | 10/2002 | Maruhashi et al. |
| 2005/0195082 | A1 | 9/2005 | Morrison |

FOREIGN PATENT DOCUMENTS

| | | |
|---|---|---|
| JP | 2001260274 | 9/2001 |

OTHER PUBLICATIONS

Int'l Search Report and Written Opinion dated May 1, 2007 for related PCT Application No. PCT/US06/016826.

Supplementary European Examination Report dated Jun. 5, 2009 for related European Application No. EP06752085.

* cited by examiner

METHOD OF FABRICATING A MODULE, FOR MILLIMETER WAVE MULTI-GIGABIT WIRELESS SYSTEMS

CROSS-REFERENCE TO RELATED APPLICATIONS

This application a divisional of U.S. patent application Ser. No. 11/394,498, filed 31 Mar. 2006, (issued as U.S. Pat. No. 7,864,113), which claims the benefit of U.S. Provisional Application Nos. 60/666,839 and 60/666,840, both filed 31 Mar. 2005, and U.S. Provisional Application Nos. 60/667,287, 60/667,312, 60/667,313, 60/667,375, 60/667,443, and 60/667,458, collectively filed 1 Apr. 2005, the entire contents and substance of all said applications hereby incorporated by reference.

BACKGROUND OF THE INVENTION

1. Field of the Invention

The present invention relates to communication networks and, more particularly, to improved packaging of high speed communication devices.

2. Description of Related Art

As the world becomes more reliant on electronic devices, and portable devices, the desire for faster and more convenient devices continues to increase. Accordingly, manufacturers and designers of such devices strive to create faster, easier to use, and more cost-effective devices to serve the needs of consumers.

Indeed, the demand for ultra-high data rate wireless communication has increased, in particular due to the emergence of many new multimedia applications. Due to some limitations in these high data rates, the needs for ultra-high speed personal area networking (PAN), and point-to-point or point-to-multipoint data links become vital.

Conventional wireless local area networks (WLAN), e.g., 802.11a, 802.11b, and 802.11g standards, are limited, in the best case, to a data rate of only 54 Mb/s. Other high speed wireless communications, such as ultra wide band (UWB) and multiple-input/multiple-output (MIMO) systems can extend the data rate to approximately 100 Mb/s.

To push through the gigabit per second (Gb/s) spectrum, either spectrum efficiency or the available bandwidth must be increased. Consequently, recent development of technologies and systems operating at the millimeter-wave (MMW) frequencies increases with this demand for more speed.

Fortunately, governments have made available several GHz (gigahertz) bandwidth unlicensed Instrumentation, Scientific, and Medical (ISM) bands in the 60 GHz spectrum. For instance, the United States, through the Federal Communications Commission (FCC), allocated 59-64 GHz for unlicensed applications in the United States. Likewise, Japan allocated 59-66 GHz for high speed data communications. Also, Europe allocated 59-62, 62-63, and 65-66 GHz for mobile broadband and WLAN communications. The availability of frequencies in this spectrum presents an opportunity for ultra-high speed, short-range wireless communications.

Unfortunately, the high cost of MMIC (monolithic microwave integrated circuit) chipsets and packaging devices operating at ultra-high frequencies and/or ultra-high speeds affects the number of consumers that can enjoy these advances in technology. Conventional solutions of MMW radios cost often several hundred, or even several thousand dollars. The high costs of MMW radios are due to high costs of material used, as well as costs associated with low volume fabrication, and assembly processes. Moreover, antennas for MMW radios are traditionally implemented using either metallic horn antennas, or large planar array printed micro-strips, that are connected to a module, which further increase manufacturing costs.

Conventional MMW MMIC chipsets is based on PHEMT (pseudomorphic high electron mobility transistor), and a bulky metal housing. Additionally, MMW packaging can include a refined form of aluminum oxide—i.e., Alumina—or Teflon® based micro-strip substrates, thin film metallization, and coaxial or waveguide feed-through connectors.

Another approach to manufacturing passive devices for these high frequencies and high speeds includes the use of Low Temperature Co-Fired Ceramic (LTCC) multi-layer substrate as a platform for module integration. The LTCC substrate reduces the costs of materials, in comparison to those described above. Further cost reduction, however, is necessary for competitive high volume production.

The combination of CMOS (complementary metal-oxide semiconductor) and SiGe (Silicon Germanium) technologies with a low cost highly producible module technology, featuring low loss and embedded functionality, i.e., antennas, is required to enable a high volume commercial use of high frequency technologies, e.g., 60 GHz. Accordingly, antenna solutions are required for multi-gigabits indoor wireless communication in the MMW region.

What is needed, therefore, is an improved packaging of MMW radios, which lowers manufacturing and material costs. It is to such a method and device that that present invention is primarily detected.

BRIEF SUMMARY OF THE INVENTION

The present invention comprises a method of fabricating an ultra-high frequency module comprising: providing a top layer having a high frequency substrate; drilling the top layer to establish vertical vias in the top layer; milling the top layer to define a top layer cavity for receiving a chipset; providing a bottom layer comprising a reinforcement structure, the bottom layer having a double clad core and a bottom substrate; adhering the double clad core and the bottom substrate of the bottom layer together with an adhesive; milling the bottom layer to define a bottom layer cavity; aligning the top layer and the bottom layer; and adhering the top layer to the bottom layer with the adhesive.

The method of fabricating can further comprise assembling external components on a surface of the top layer and the bottom layer. Also, the method can enable the operation of the ultra-high frequency module at approximately 60 GHz.

The top layer can comprise liquid crystal polymer (LCP), and the bottom layer can comprise fire resistant 4 (FR4). The method of fabricating can further comprise integrating a printed filter and a filtered antenna into the module. Moreover, the method of fabricating can further comprise encapsulating the top layer and the bottom layer.

In a preferred embodiment, the method of fabricating can further include fabricating the top layer and the bottom layer on a large area panel of a printed circuit board, wherein the large area panel is approximately 12 inches by 18 inches or larger.

In a preferred embodiment, the adhesive is a pressure sensitive adhesive enabling room-temperature lamination, a solid electrical connection between connections, and an accurate alignment of the top layer and the bottom layer.

In another exemplary embodiment, a method of fabricating an ultra-high frequency module operating at ultra-high speeds comprises providing a top layer comprising a high frequency substrate and defining a top layer cavity, providing a bottom layer comprising a double clad core and defining a bottom layer cavity, adhering the top layer to the bottom layer, and providing a dual-capacity, dual-polarization antenna for communicating at approximately 60 GHz and at approximately 10 GB/s, the antenna suspended by the top layer above the bottom layer cavity, wherein the dual-capacity, dual-polarization antenna functions as a bidirectional antenna when the module is mounted on an unclad core, and wherein the dual-capacity, dual-polarization antenna functions as a cavity-backed antenna when the module is mounted on a single or double clad core.

In another exemplary embodiment, a method of fabricating an ultra-high frequency module operating at ultra-high speeds comprises providing a top layer comprising a high frequency substrate and defining a top layer cavity, providing an integrated circuit positioned within the top layer cavity, providing a bottom layer comprising a double clad core and defining a bottom layer cavity, adhering the top layer to the bottom layer, and providing a dual-capacity, dual-polarization antenna for communicating at approximately 60 GHz and at approximately 10 GB/s, the antenna suspended by the top layer above the bottom layer cavity, wherein the dual-capacity, dual-polarization antenna functions as a bidirectional antenna when the module is mounted on an unclad core, and wherein the dual-capacity, dual-polarization antenna functions as a cavity-backed antenna when the module is mounted on a single or double clad core.

In another exemplary embodiment, a method of fabricating an ultra-high frequency module operating at ultra-high speeds comprises providing a top layer comprising a high frequency substrate and defining a top layer cavity, positioning a monolithic microwave integrated circuit (MMIC) within the top layer cavity such that the MMIC is flush with the top layer, providing a bottom layer comprising a double clad core and defining a bottom layer cavity, adhering the top layer to the bottom layer, and providing a dual-capacity, dual-polarization antenna for communicating at approximately 60 GHz and at approximately 10 GB/s, the antenna suspended by the top layer above the bottom layer cavity, wherein the MMIC is directly connected to the dual-capacity, dual-polarization antenna, wherein the dual-capacity, dual-polarization antenna functions as a bidirectional antenna when the module is mounted on an unclad core, and wherein the dual-capacity, dual-polarization antenna functions as a cavity-backed antenna when the module is mounted on a single or double clad core.

An ultra-high frequency module operating at ultra-high speeds is further disclosed. The module comprises: a top layer having a high frequency substrate, the top layer defining a top layer cavity; a bottom layer having a double clad core and a bottom substrate, the bottom layer defining a bottom layer cavity; and an adhesive to adhere the top layer to the bottom layer, and to adhere the double clad core of the bottom layer and the bottom substrate of the bottom layer, wherein the top layer and the bottom layer are fabricated on a large area panel of a printed circuit board.

The module can further comprise an antenna for communicating at approximately 60 gigaHertz (GHz), wherein the antenna is adapted to transmit data wireless at least 2.5 gigabits per second (Gb/s).

The antenna of the module can be selected from the group consisting of a 1 by 4 patch array antenna, a 2 by 2 series patch array antenna, a 2 by 2 dual edge patch array antenna, a 2 by 2 dual corner patch array antenna, a 4 by 4 array antenna, and a circularly polarized antenna.

The top layer of the module can comprise LCP and the bottom layer comprises FR4. Additionally, the top layer defines a cavity for receiving a monolithic microwave integrated circuit. The bottom layer preferably defines a cavity for receiving a printed antenna.

An ultra-high frequency multi-sector module comprising: a top layer comprising a high frequency substrate; a bottom layer comprising a sturdy and electric material; and an adhesive for connecting the top layer to the bottom layer, wherein at least two modules are connected to one another creating an angle therebetween enabling signals from different angles to be received by the multi-sector module. The multi-sector module can operate at frequency of approximately 60 GHz.

The top layer can comprise liquid crystal polymer and the bottom layer comprises fire resistant 4. The bottom layer can define a trench at the angle, wherein a portion of fire resistant 4 is omitted, and wherein the top layer is flexible enabling a bent shape of the multi-sector module. The multi-sector module can further comprise a pyramidal shape for covering 360 degrees in azimuth.

These and other objects, features and advantages of the present invention will become more apparent upon reading the following specification in conjunction with the accompanying drawing figures.

DETAILED DESCRIPTION OF THE INVENTION

Figure 1:
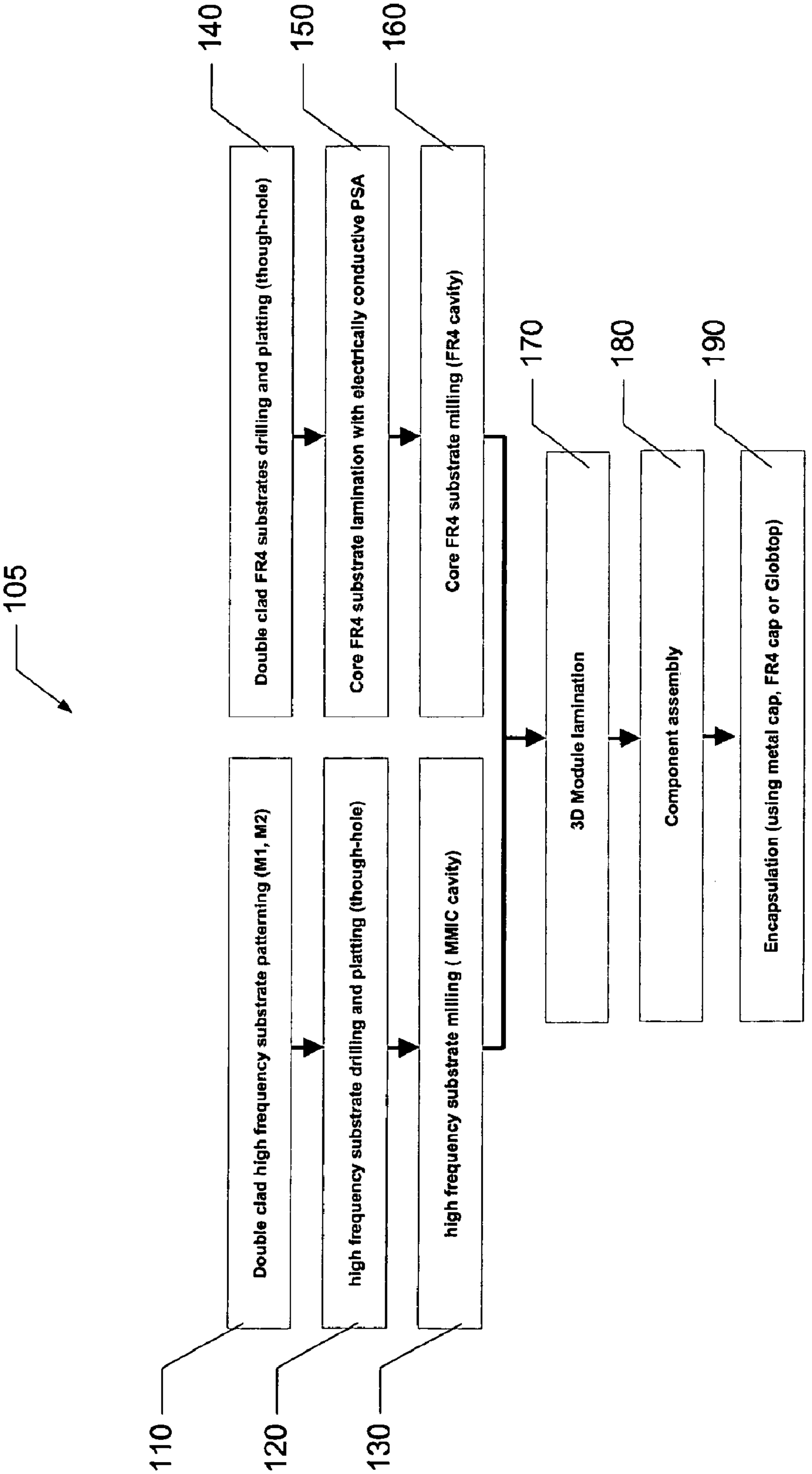
FIG. 1 depicts a flowchart of preferred fabrication steps of a module, in accordance with a preferred embodiment of the present invention.

To facilitate an understanding of the principles and features of the various embodiments of the invention, various illustrative embodiments are explained below. Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. In particular, the invention is described in the context of being a wireless module for operation at ultra-high frequencies and ultra-high data communication speeds.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention is a wireless module 100. The module 100 preferably includes a top layer 200, a bottom layer 300, and an adhesive 400 to connect the top layer 200 to the bottom layer 300.

The wireless module 100 can be adapted to receive/transmit ultra-high frequencies at ultra-high speeds. For instance, preferably the wireless module 100 can operate at approximately 60 GHz at approximately 10 Gb/s.

FIG. 1 depicts a flowchart of fabrication step of the module 100. A method 105 of fabricating the module 100 includes providing a top layer 200. The top layer 200 can comprise double-side patterning of a double-clad high frequency dielectric substrate 205 to define a passive millimeter-wave circuit 210 (i.e., interconnection, filter, and antenna).

Thus, the method 105 at 110, preferably, metallizing the circuit 210 having copper, wherein having a thickness between 9 to 18 microns. Moreover, gold plating of the circuit 210 is preferred for wire bonding, surface mounting, and additional protection.

Liquid Crystal Polymer (hereinafter "LCP") is a preferred high frequency substrate 205, and can comprise the top layer 200. The Rogers Corporation is a preferred manufacturer of LCP for the present invention. Hence, a preferred LCP is manufactured by the Rogers Corporation is RO3600. The thickness of the high frequency substrate 205—the LCP layer—can be in the range of 4 to 10 mils, depending on the material availability and design requirements.

More commons materials, however, such as RO4003 or RO3003 (by happenstance, also manufactured by Rogers Corporation), or even other equivalent dielectric materials, can further be used for the top layer 200.

At 120, the method 105 further includes drilling and plating of the high frequency substrate 205 to realize a vertical via 215 of the top layer 200. Next, at 130, milling a cavity 220 can occur. The cavity 220 of the top layer 200 can host a MMIC (monolithic microwave integrated circuit) chipset (see FIG. 2A). In a preferred embodiment, the cavity 220 of the top layer 200 is sufficiently large enough to receive the MMIC chipset.

A bottom layer 300 can be provided. At 140, the method 105 of fabrication further comprises the step of drilling and plating of the bottom layer 300. The bottom layer 300 can comprise a double clad core 305 and a bottom substrate 310. Preferably, the bottom substrate 310 comprises FR4. FR4 is an abbreviation for Flame Resistant 4. FR4 is an epoxy material reinforced with a woven fiberglass mat, often used in the manufacturing of printed circuit boards (PCBs). Since FR4 is widely used to build high-end consumer and industrial electronic equipment, it is widely available and, hence, cost effective.

Preferably, at 150, the method 105 of fabricating further includes laminating both sides of the FR4 core substrate 310 using, preferably, an electrically conductive pressure sensitive adhesive 400. Indeed, 3M-9713 adhesive tape, manufactured by 3M®, can be used. Next, at 160, the method 105 further includes milling a cavity 315 in the FR4 core substrate 310 of the bottom layer 300. (See FIG. 2B).

At 170, the method 105 further can comprise aligning and laminating the high frequency substrate 205, the FR4 core 305, and the FR4 bottom substrate 310, i.e., the top layer 200 and the bottom layer 300. The use of the pressure sensitive adhesive 400 can enable room-temperature lamination, a good electrical connection between the three substrates (205, 305 and 310), as well as a good accuracy alignment of the layer. (See FIG. 3).

The preferred next step of the method 105, at 180, includes assembling components onto the module 100—i.e., both surface mounted and wire-bonded components. The appropriate depth of the cavity 220 into the high frequency substrate 205 allows for a very short wire-bonding length between the MMIC and the module 100. Finally, at 190, encapsulating can occur. Encapsulation can occur using a conventional device, such as using metal cap, FR4 based cap, globtop, and the like. The step of encapsulating can isolate, protect and enclose the module 100.

The method 105 and resulting module 105 topology can enable efficient and simultaneous integration of the MMIC, a printed filter, a printed antenna, and many other printed passive devices for millimeter-wave applications in a single fabrication large area (i.e., approximately 12 by 18 inches, and/or approximately 18 by 24 inches) printed wire board (PWB) process. The dimension range that is possible to fabricate the module can be compatible with design requirements for operating frequencies around approximately 60 GHz, i.e., approximately in the range of 54-66 GHz. Although, as one skilled in the art would recognize, the dimensions of the top layer 200 and bottom layer 300 can easily be altered to increase or decrease the frequency of the module 100.

The preferred topology of the module 100 can support a quasi-hermetic packaging solution for the MMIC. The topology can further enable integration of direct current and millimeter waves feed-through interconnection, planar filters, integrated waveguide filter, broadside, end-fire, reflector, bidirectional ultra-wide bandwidth linear, circular polarization antenna arrays, and the like.

Figure 2A:
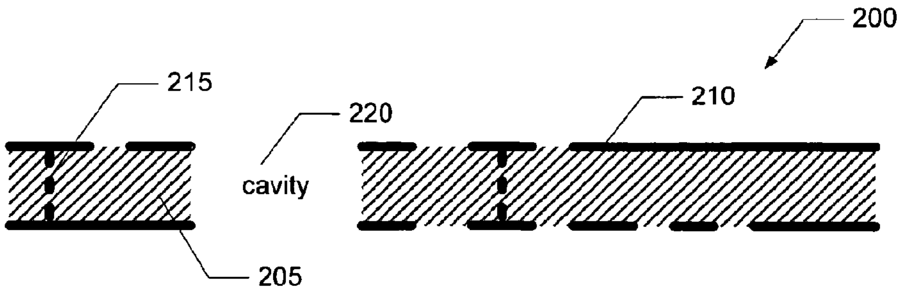
FIG. 2A depicts a cross-section view of a top layer of the module, in accordance with a preferred embodiment of the present invention.

FIG. 2A illustrates a cross-section view of the top layer 200 of the module. The top layer 200 can contain a high frequency substrate 205, preferably comprising LCP. Although, as described, and as one skilled in the art would recognize, other materials can be implemented. For example, the Rogers Corporation manufactures RO4003 and RO3003, which can be used in the top layer 200.

LCP offers a low-cost alternative for millimeter wave module implementation. Indeed, LCP combines uniquely outstanding microwave and mechanical performances at low cost, as well as in large area processing capabilities.

The thickness of the top layer 200 can be in the range of approximately 4 to 10 mils.

The cavity 220 of the top layer 200 can be adapted to receive the MMIC circuit, and thus the cavity 220 is preferably large enough to receive the MMIC circuit.

Figure 2B:
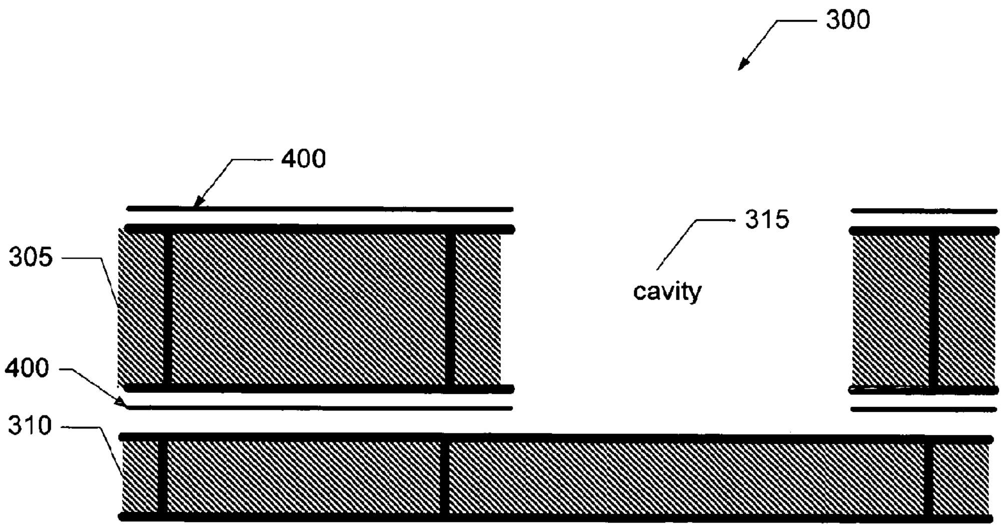
FIG. 2B depicts a cross-section view of a bottom layer of the module, in accordance with a preferred embodiment of the present invention.

FIG. 2B illustrates a cross-section view of the bottom layer 300 of the module 100. The bottom layer 300 preferably contains a stable and sturdy material. In a preferred embodiment, the bottom layer 300 includes FR4.

The thickness of the bottom layer 300 comprises the double clad core 305 and the bottom substrate 310. The thickness of the double clad core 305 is in the range of approximately 35 to 45 mils. The thickness of the bottom substrate 310 is, preferably, in the range of approximately 15 to 25 mils.

The top layer 200 and the bottom layer 300 of the module 100 are preferably connected. The top layer 200 and the bottom layer 300 can be connected via an adhesive 400. The adhesive 400 is preferably a pressure sensitive adhesive, such as 3M®'s 9713, which is an electrically conductive tape. Indeed, the 9713 tape is a pressure sensitive adhesive 400 transfer tape with isotropic electrical conductivity. Innovative conductive fibers of the 9713 extend above the adhesive 400, ensuring a solid electrical connection between the substrates—in this case, between the top layer 200 and the bottom layer 300. One skilled in the art would recognize that other materials can be implemented to connect the top layer 200 to the bottom layer 300 in the present invention.

The top layer 200 (preferably comprising LCP), the bottom layer 300 (preferably comprising FR4), and the adhesive 400 (preferably comprising 3M-9713) combine (collectively "the layers") to provide a low cost packaging system for the module 100. Moreover, the layers can be fabricated on a large area panel (approximately 12 by 18 inches or larger); thus, when manufactured in high quantities can further reduce cost. The module 100, when complete can many sizes from 1 $mm^2$ to the whole size of the layers 200 and 300.

Figure 3:
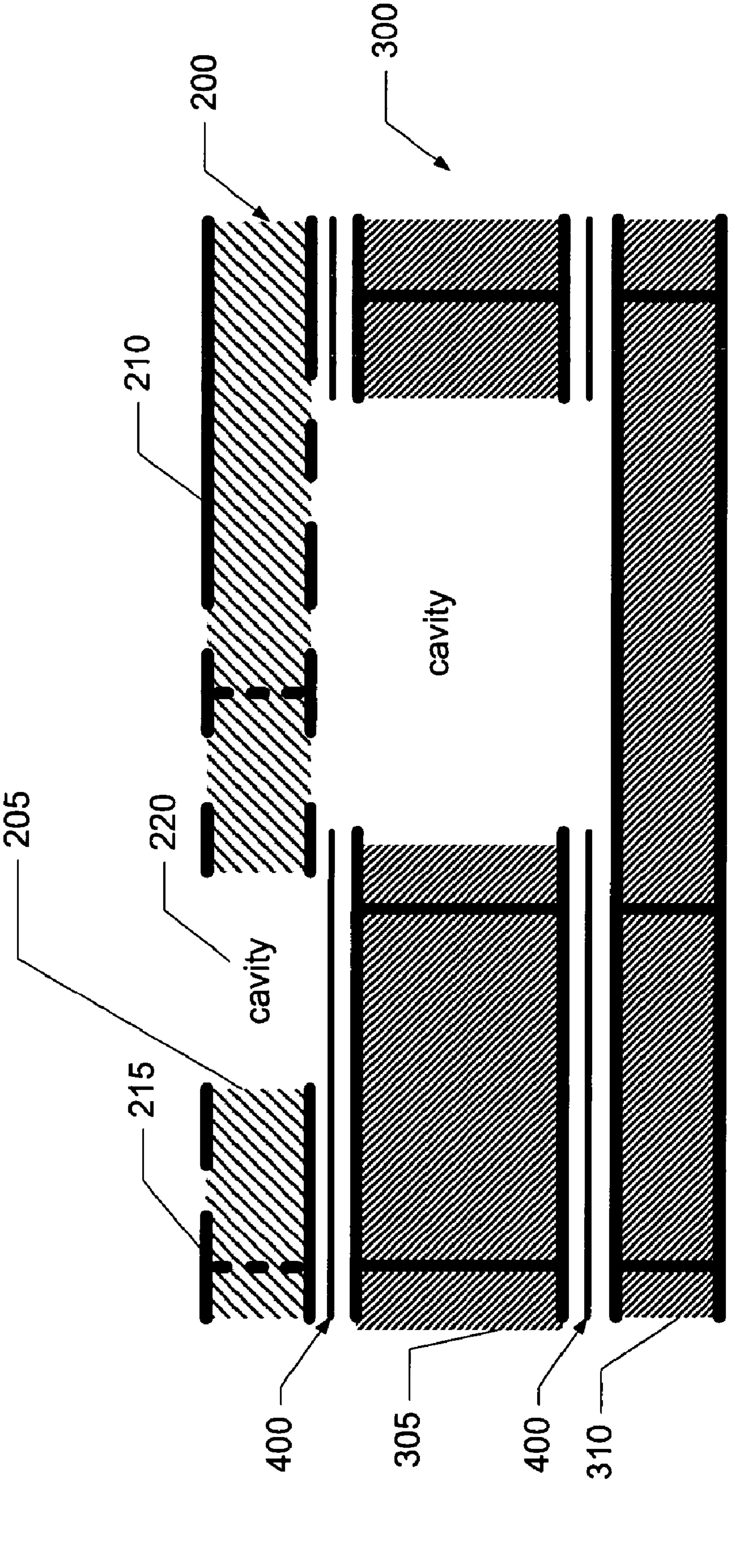
FIG. 3 depicts a cross-section view of the module, illustrating the top layer and bottom layer combined to form the module, in accordance with a preferred embodiment of the present invention.

FIG. 3 illustrates a cross section view of the module 100, wherein the layers 200 and 300 are connected with the adhesive 400.

Figure 4A:
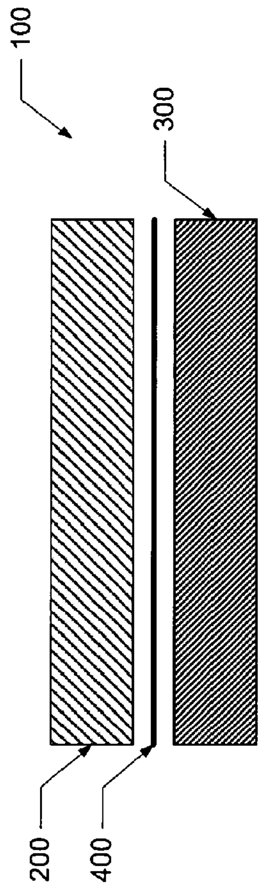
FIG. 4A depicts a cross-section view of the module, in accordance with a preferred embodiment of the present invention.
Figure 4B:
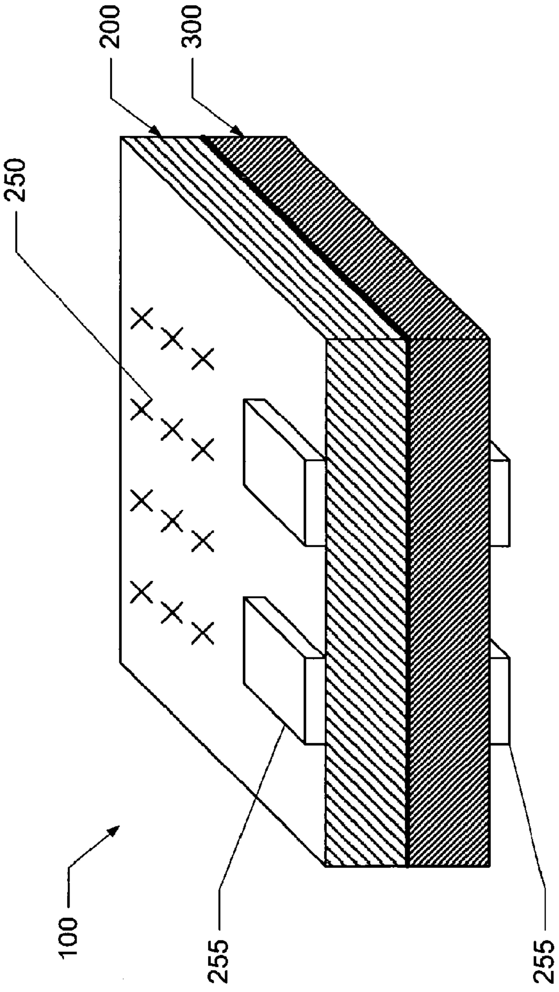
FIG. 4B depicts a perspective view of the module, in accordance with a preferred embodiment of the present invention.

FIG. 4A illustrates a cross section view of the module 100, wherein the layers 200 and 300 are connected. FIG. 4B illustrates a perspective view of the module 100. An antenna array 250 is shown on the top layer 200. Additionally, a surface of the top layer 200, or the bottom layer 300 can include components 255. The components 255 can be surface mount or through-hole.

As illustrated in exemplary embodiments, efficient integration of printed filters on the module 100 have been validated by various examples, many exemplary embodiments are illustrated in FIGS. 5A-5B, 6A-6B and 7A-7B.

Figure 5A:
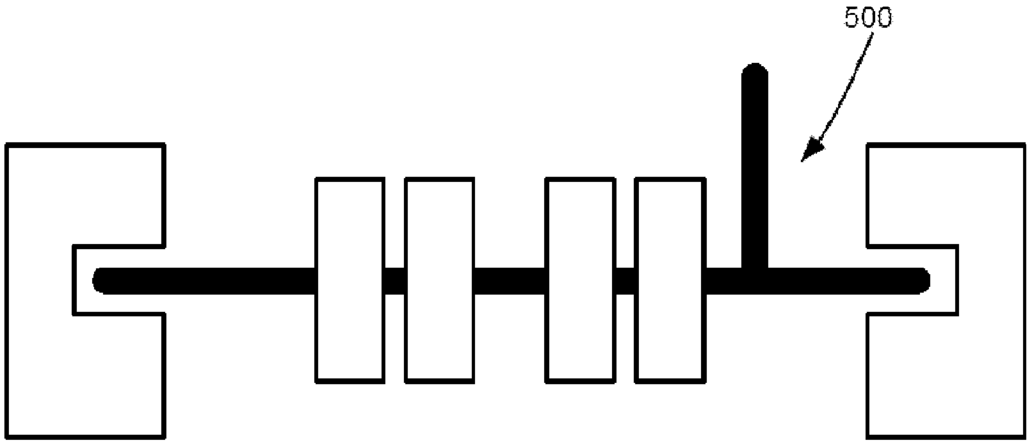
FIG. 5A depicts a top view of a liquid crystal polymer planar series fed slotted patch filter, in accordance with a preferred embodiment of the present invention.
Figure 5B:
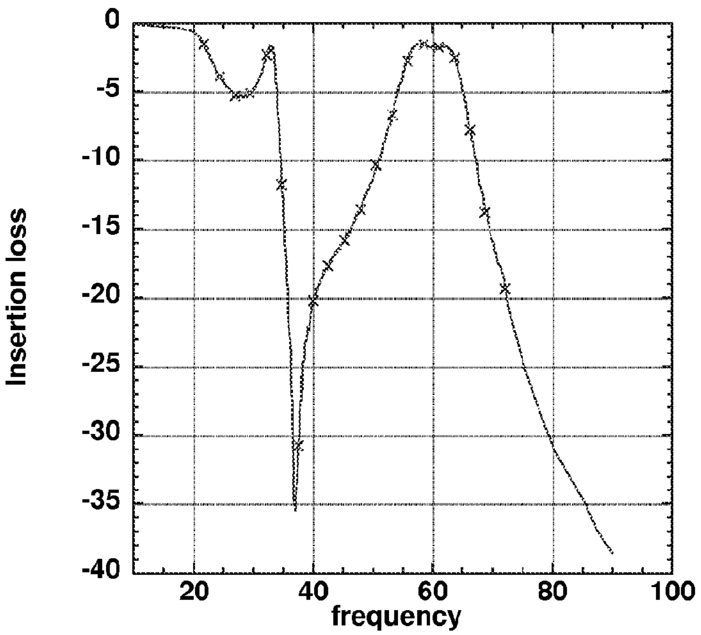
FIG. 5B depicts a graphical representation of the insertion loss versus frequency of the liquid crystal polymer planar series fed slotted patch filter, in accordance with a preferred embodiment of the present invention.

FIG. 5A illustrates a LCP planar series fed slotted patch filter 500. In the series slotted patch filter 500, the bandwidth is in the range of approximately 55 to 65 GHz. The resulting insertion loss is approximately −1.5 dB (decibels) at approximately 60 GHz. FIG. 5B illustrates a graphical representation of the performance of the series slotted patch filter 500, wherein graphing an exemplary relationship of insertion loss versus frequency. Both measured and simulated representations are illustrated.

Figure 6A:
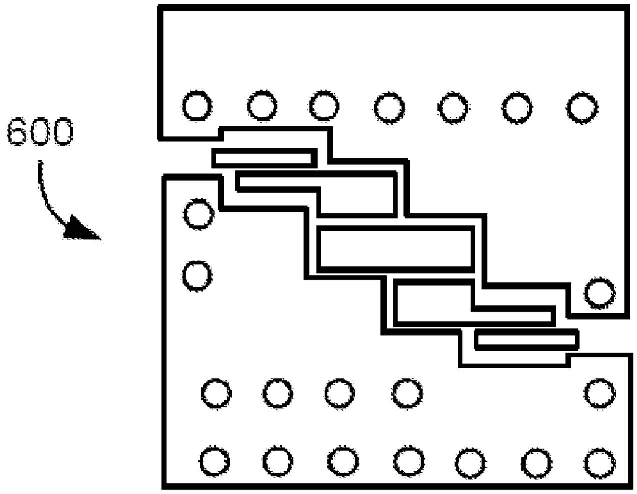
FIG. 6A depicts a top view of a liquid crystal polymer, backed co-planar wave (BCPW) filter, in accordance with a preferred embodiment of the present invention.
Figure 6B:
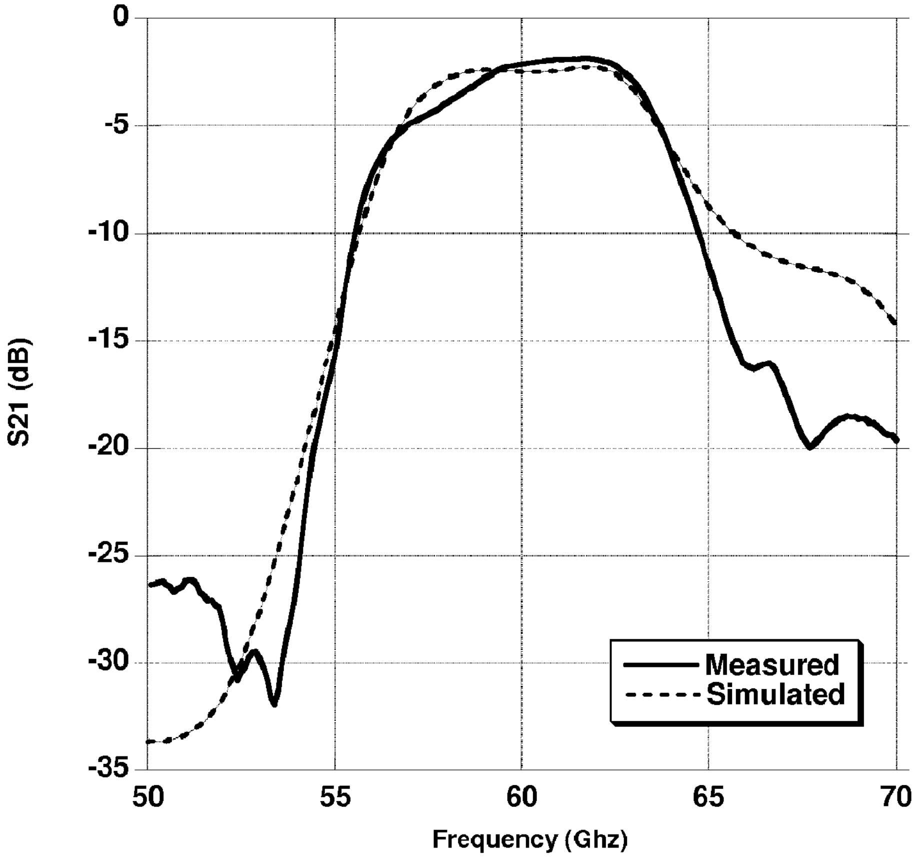
FIG. 6B depicts a graphical representation of the insertion loss versus frequency of the liquid crystal polymer BCPW filter, in accordance with a preferred embodiment of the present invention.

FIG. 6A illustrates a LCP BCPW (backed co-planar wave) filter 600. In the LCP BCPW filter 600, the bandwidth is in the range of approximately 57 to 64 GHz. The resulting insertion loss is approximately −1.85 dB at approximately 60.3 GHz. FIG. 6B illustrates a graphical representation of the performance of the BCPW filter 600, wherein graphing an exemplary relationship of insertion loss versus frequency. Both measured and simulated representations are illustrated.

Figure 7A:
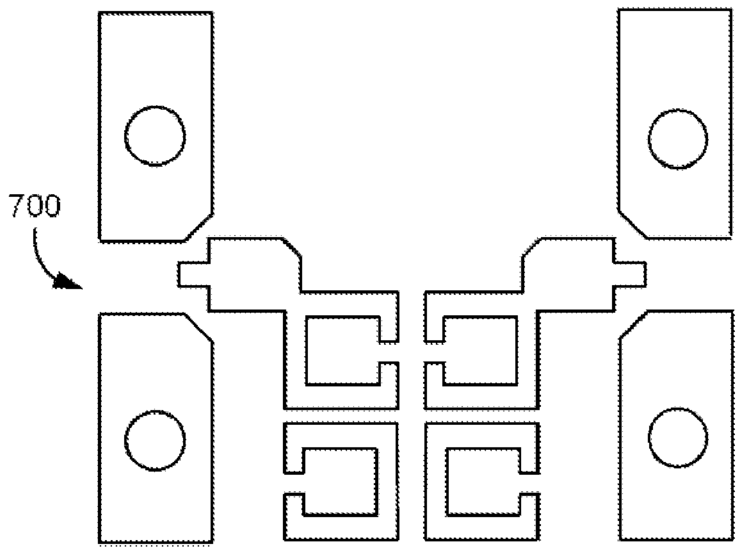
FIG. 7A depicts a top view of a liquid crystal polymer planar elliptic filter, in accordance with a preferred embodiment of the present invention.
Figure 7B:
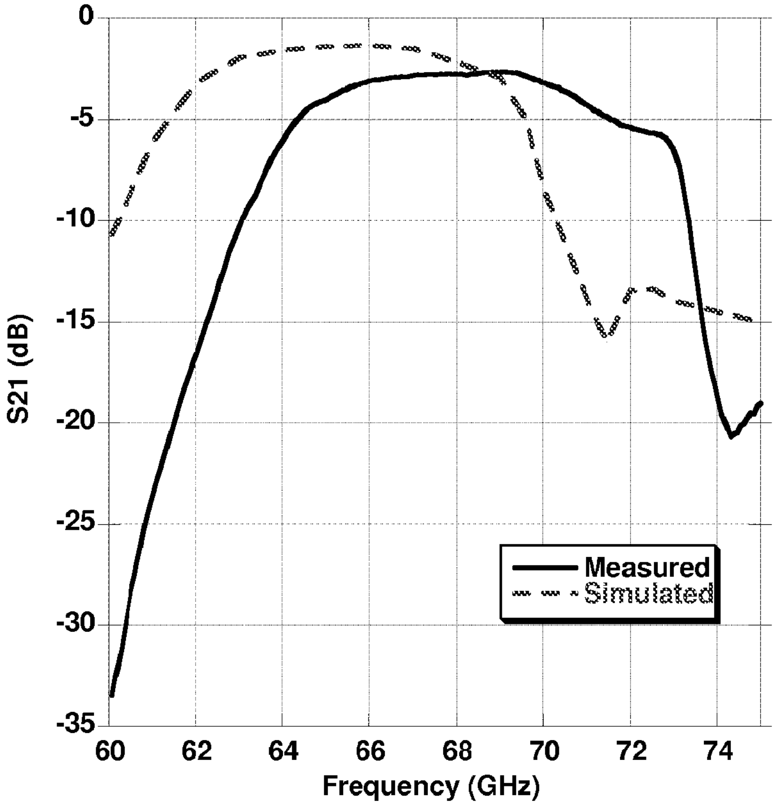
FIG. 7B depicts a graphical representation of the insertion loss versus frequency of the liquid crystal polymer planar elliptic filter, in accordance with a preferred embodiment of the present invention.

FIG. 7A illustrates a LCP planar elliptic filter 700. In the elliptic filter 700, the bandwidth is in the range of approximately 64 to 72 GHz. The resulting insertion loss is approximately −2.6 dB at approximately 68 GHz. FIG. 7B illustrates a graphical representation of the performance of the elliptic filter 700, wherein graphing the insertion loss versus frequency. Both measured and simulated representations are illustrated.

FIGS. 8A-8C, 9A-9B, 10A-10C, and 11A-11C illustrate exemplary results of a plurality of 60 GHz antenna array solutions integrated on LCP, including 1 by 2, 1 by 4, 1 by 6, 2 by 2, 2 by 4, and 4 by 4 array antenna designs. The fabricated antennas can be, preferably, implemented on 150 microns thick of LCP substrate. The targeted gain for these antennas has been determined to be above approximately 10 dBi, enabling a reliable 60 GHz link for WPAN (wireless personal area networking) applications.

The FIGS. 8A-8C, 9A-9C, 10A-10C, and 11A-11C illustrate examples of the linearly polarized antenna developed. Table I further summarizes these figures.

TABLE I

Summary of Linearly Polarized Antennas Array Performances

| Antenna Topology | Gain (dBi) | 10 dB bandwidth GHz | Beam-width Azimuth/Elevation (Deg.) |
|---|---|---|---|
| 1 by 4 | 12 | 1.5 | 60/15 |
| 2 by 2 | 11 | ~2 | 40/40 |
| 2 by 2 - dual edge fed | 11 | ~2 | 40/40 |
| 2 by 2 - dual corner fed | 11 | ~2 | 40/40 |

Figure 8A:
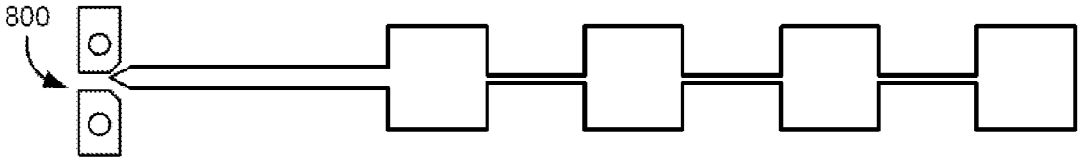
FIG. 8A depicts a top view of a 1 by 4 patch array antenna, in accordance with a preferred embodiment of the present invention.
Figure 8B:
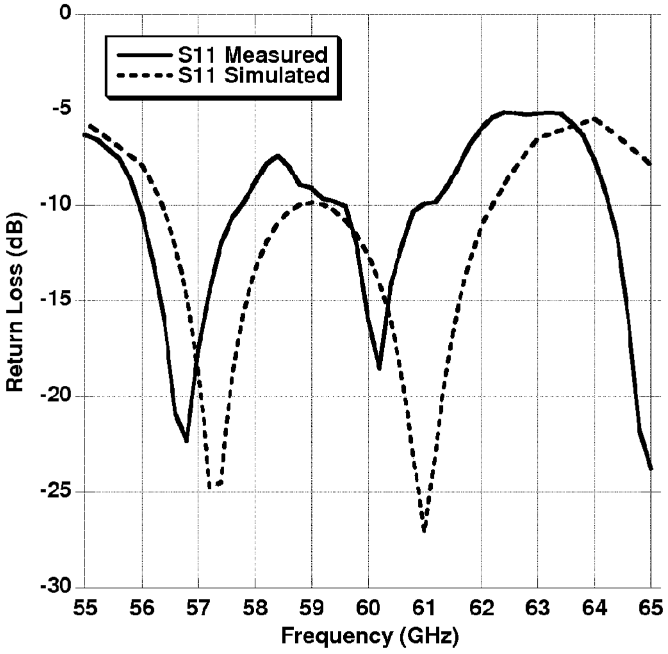
FIGS. 8B-8C depict graphical representations of the performance of the 1 by 4 patch array antenna, in accordance with preferred embodiments of the present invention.
Figure 8C:
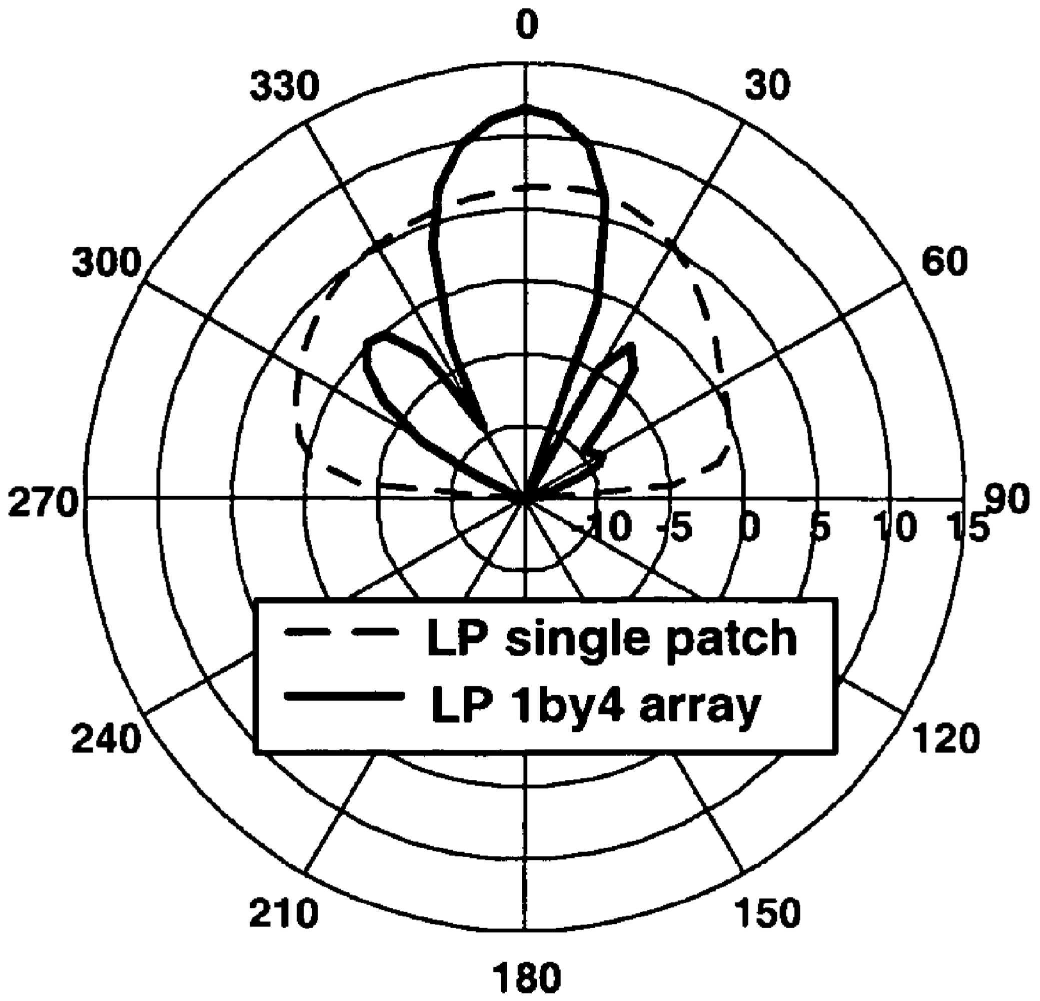

FIG. 8A illustrates a top view of a 1 by 4 patch array antenna 800. FIGS. 8B and 8C illustrate graphical representations of exemplary performances of the 1 by 4 patch array antenna 800; both FIGS. 8B and 8C illustrate measured and simulated results. FIG. 8B illustrates a graphical representation of return loss (dB) versus frequency (GHz). FIG. 8C, however, illustrates a graphical representation of the radiation path of the 1 by 4 patch array antenna 800.

Figure 9A:
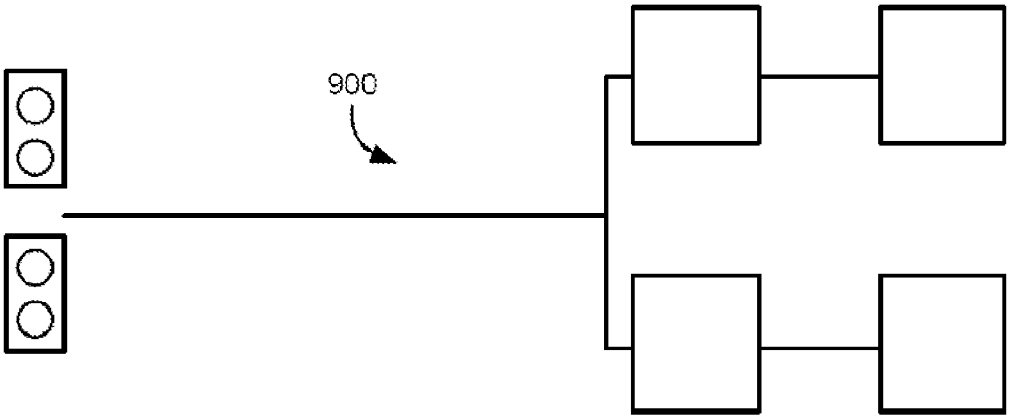
FIG. 9A depicts a top view of a 2 by 2 series patch array antenna, in accordance with a preferred embodiment of the present invention.
Figure 9B:
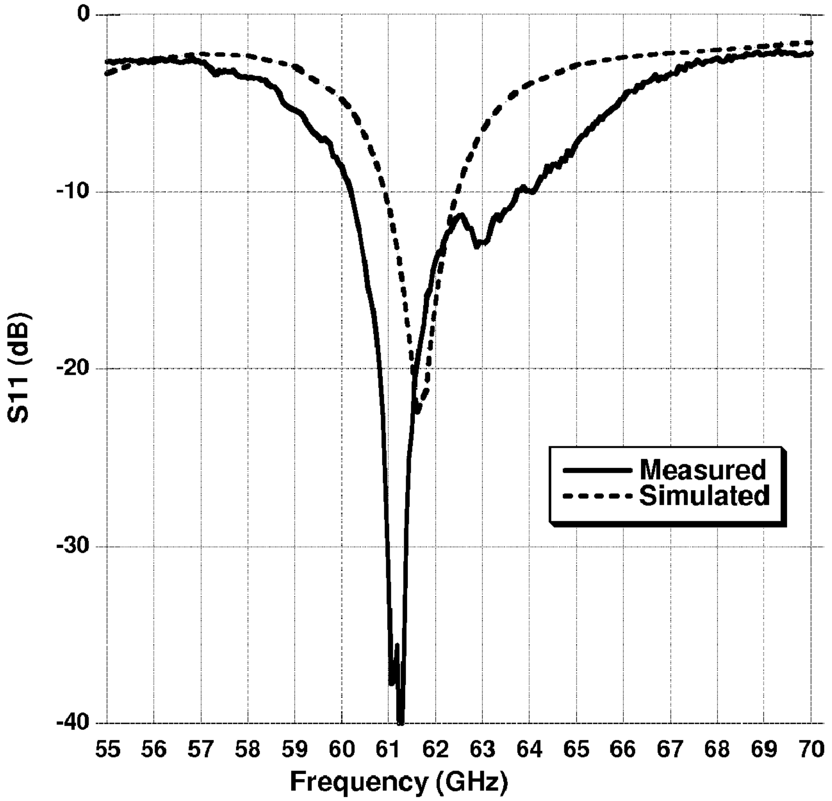
FIGS. 9B-9C depict graphical representations of the performance of the 2 by 2 series patch array antenna, in accordance with preferred embodiments of the present invention.
Figure 9C:
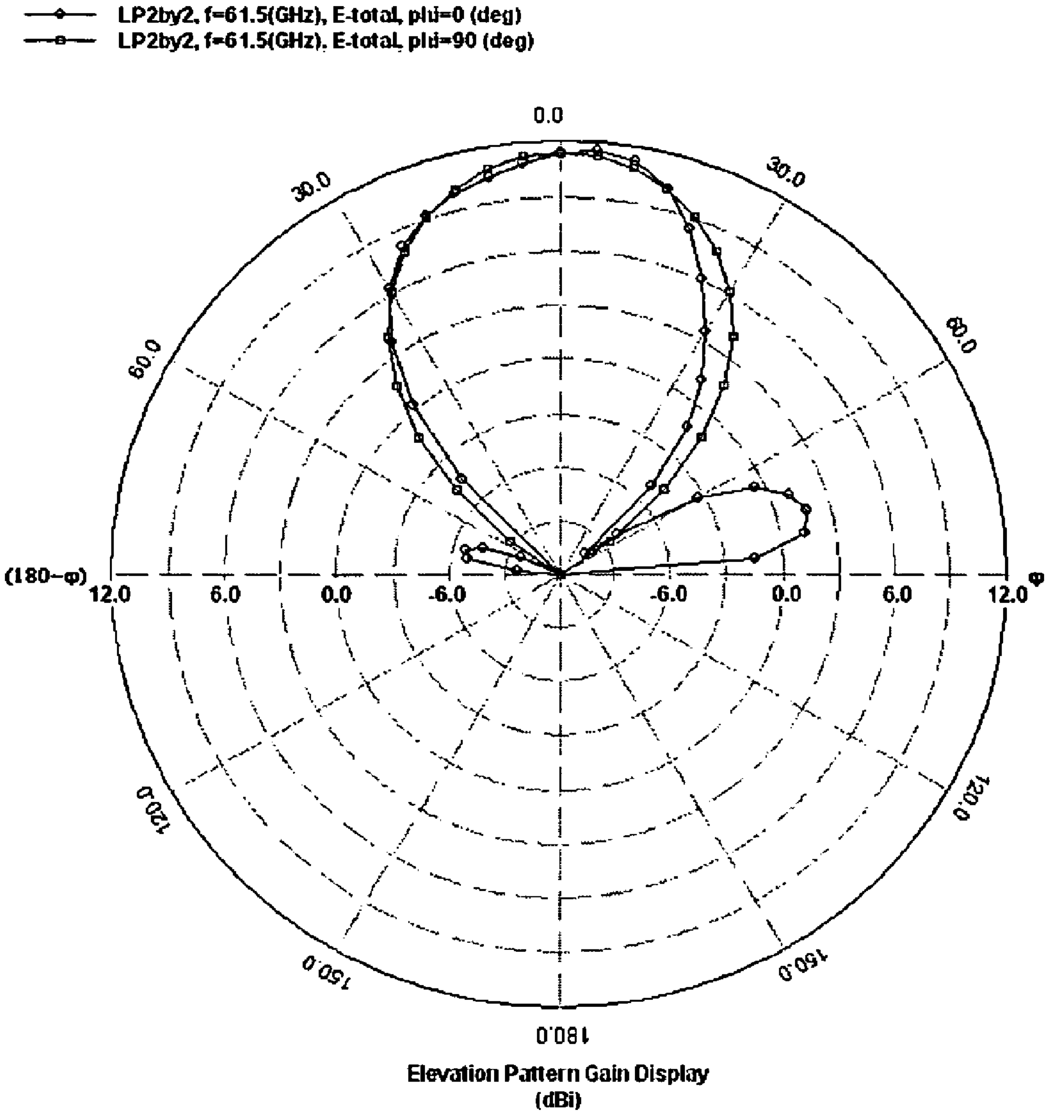

FIG. 9A illustrates a top view of a 2 by 2 series patch array antenna 900. FIGS. 9B and 9C illustrate graphical presentations of exemplary performances of the 2 by 2 series patch array antenna 900; both FIGS. 9B and 9C illustrate measured and simulated results. FIG. 9B illustrates a graphical representation of return loss (dB) versus frequency (GHz). FIG. 9C, however, illustrates a graphical representation of the radiation path of the 2 by 2 series patch array antenna 900.

Figure 10A:
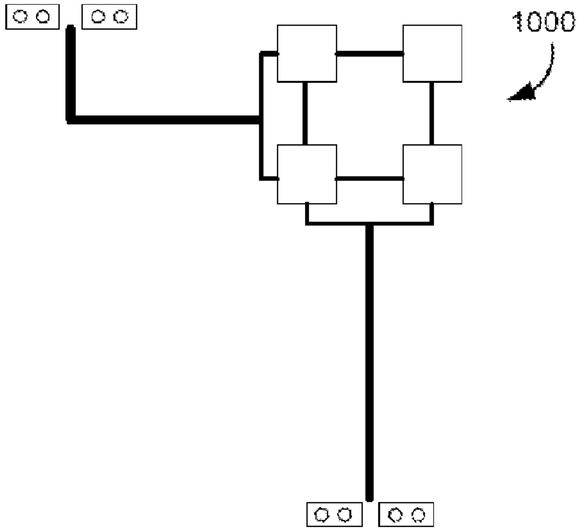
FIG. 10A depicts a top view of a 2 by 2 dual edge patch array antenna, in accordance with a preferred embodiment of the present invention.
Figure 10B:
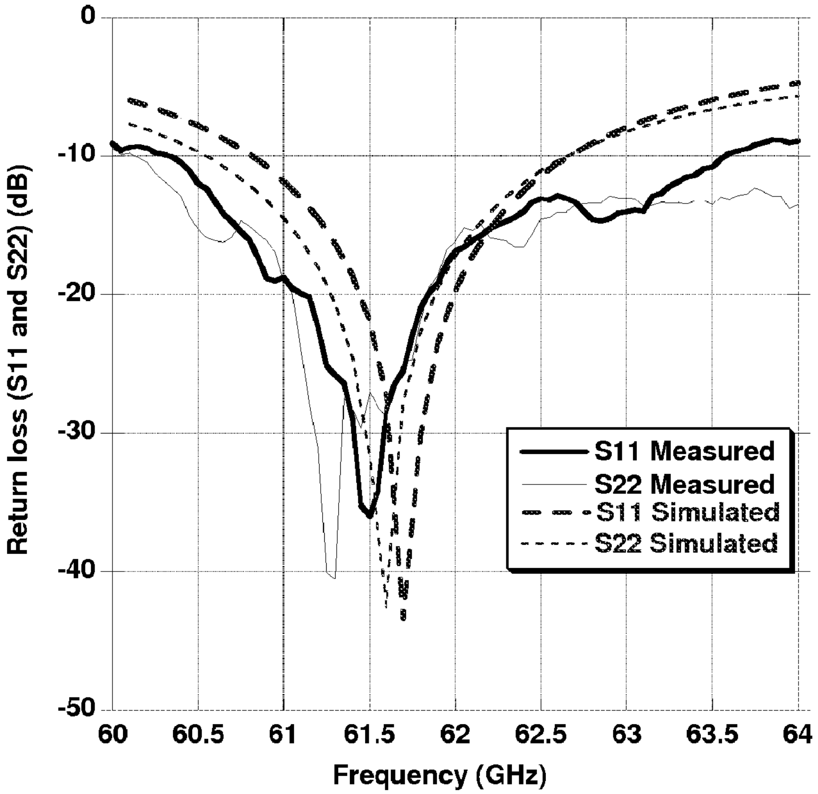
FIGS. 10B-10C depict graphical representations of the performance of the 2 by 2 dual edge patch array antenna, in accordance with a preferred embodiment of the present invention.
Figure 10C:
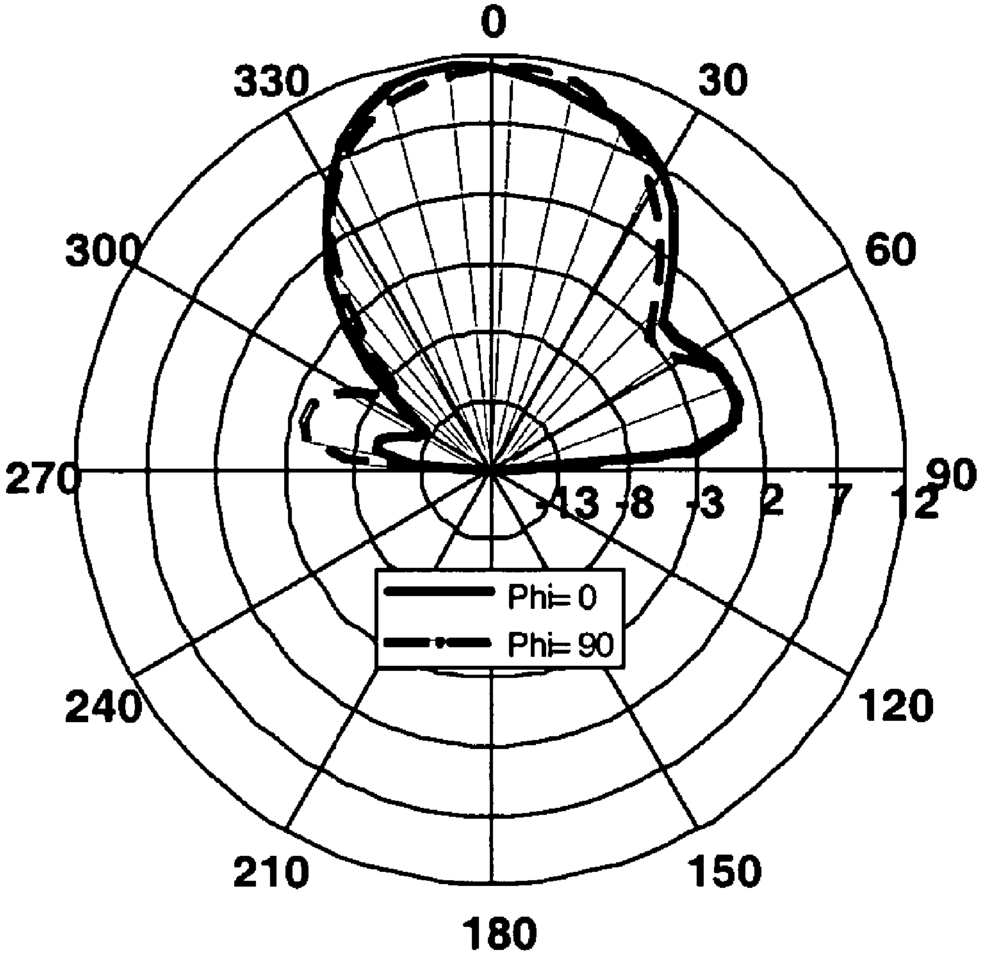

FIG. 10A illustrates a top view of a 2 by 2 dual edge patch array antenna 1000. FIGS. 10B and 10C illustrate graphical presentations of exemplary performances of the 2 by 2 dual edge patch array antenna 1000; both FIGS. 10B and 10C illustrate measured and simulated results. FIG. 10B illustrates a graphical representation of return loss (dB) versus frequency (GHz). FIG. 10C, however, illustrates a graphical representation of the radiation path of the 2 by 2 dual edge patch array antenna 1000.

Figure 11A:
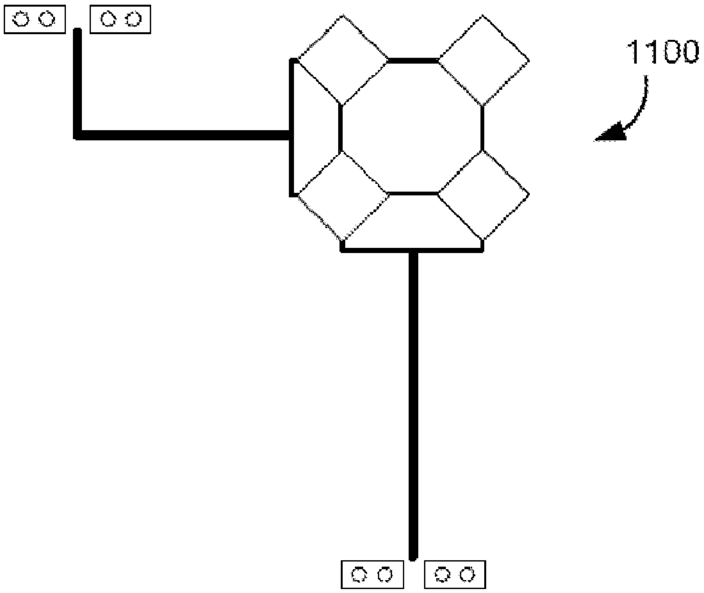
FIG. 11A depicts a top view of a 2 by 2 dual corner patch array antenna, in accordance with a preferred embodiment of the present invention.
Figure 11B:
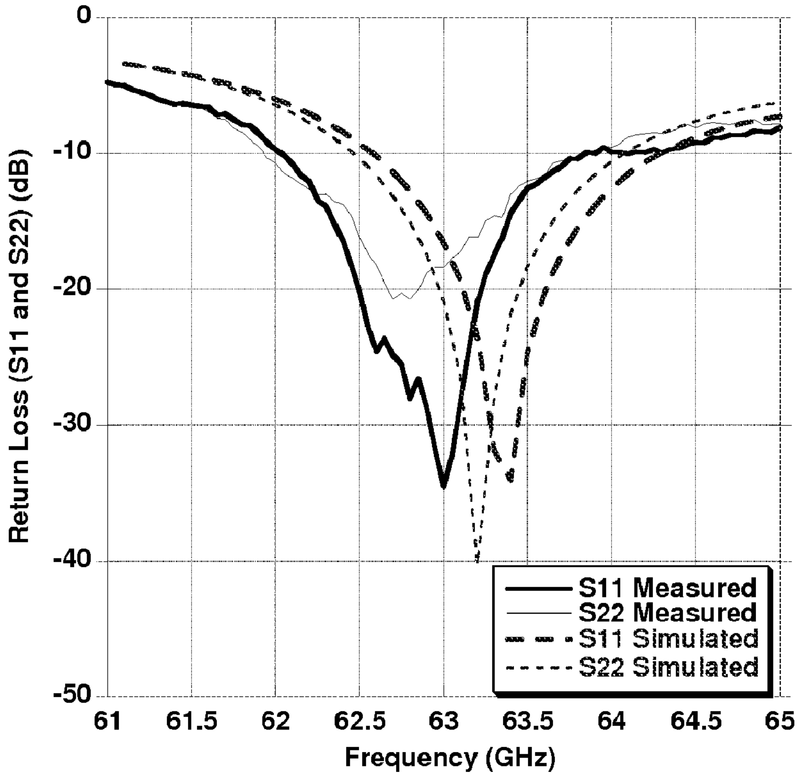
FIGS. 11B-11C depict graphical representations of the performance of the 2 by 2 dual corner patch array antenna, in accordance with a preferred embodiment of the present invention.
Figure 11C:
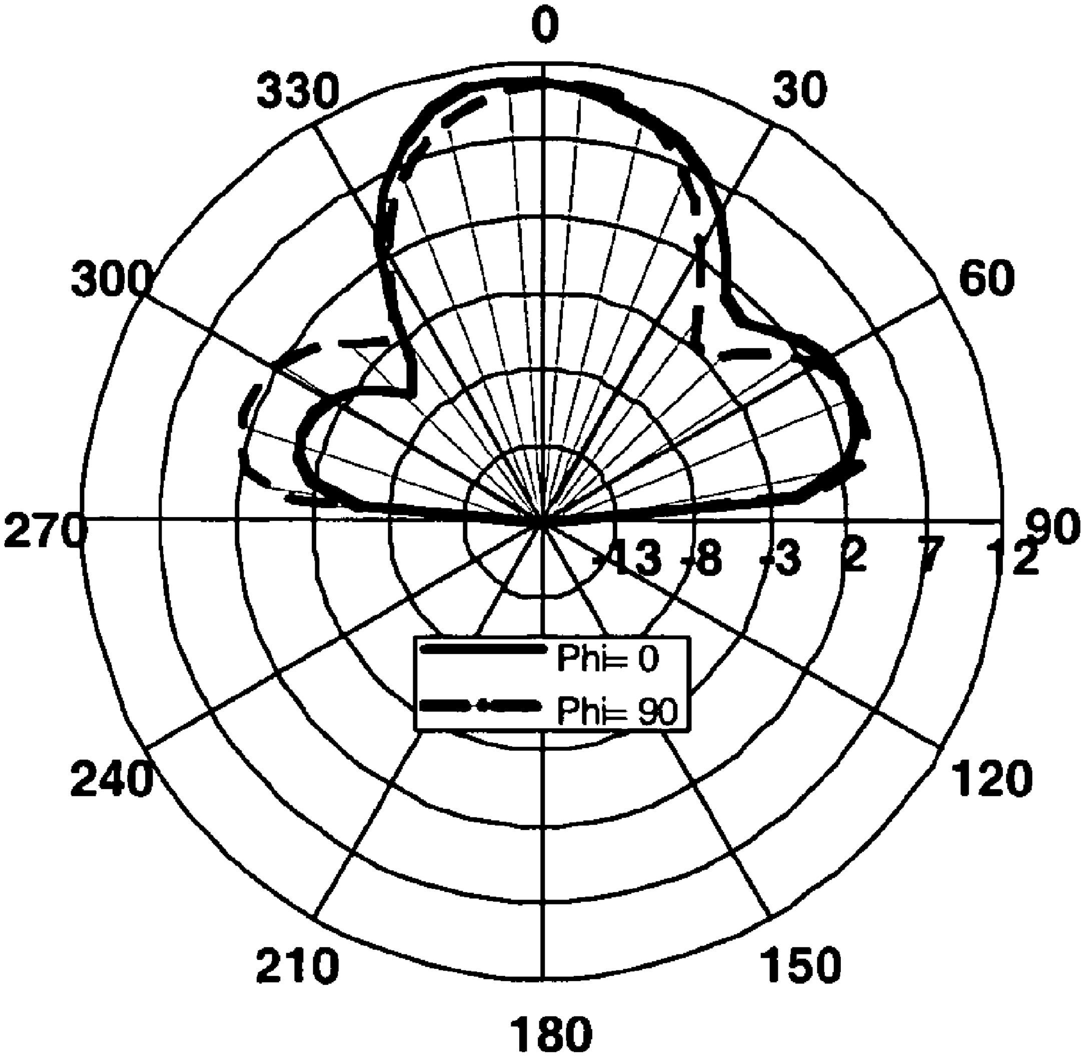

FIG. 11A illustrates a top view of a 2 by 2 dual corner patch array antenna 1100. FIGS. 11B and 11C illustrate graphical presentations of an exemplary performance of the 2 by 2 dual corner patch array antenna 1100; both FIGS. 11B and 11C illustrate measured and simulated results. FIG. 11B illustrates a graphical representation of return loss (dB) versus frequency (GHz). FIG. 11C, however, illustrates a graphical representation of the radiation path of the 2 by 2 dual corner patch array antenna 1100.

FIGS. 12A-12D and 13A-13D illustrate examples of tested circularly polarized antennas, and graphical representations of simulated and measured characteristics of the antennas. These antennas exhibit a gain above approximately 10 dBi, having an input matching range from approximately 2 to 9 GHz, wherein providing a solution for multi-gigabit WPAN applications. In addition, the resulting axial ratio performance produces an ability to mitigate multi-path effect occurring in a WPAN scenario.

Figure 12A:
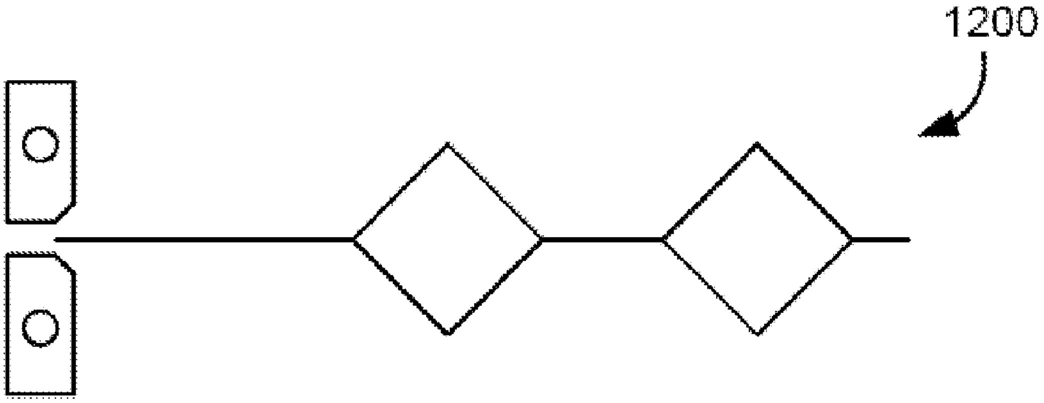
FIG. 12A depicts a top view of a 1 by 2 circularly polarized antenna, in accordance with a preferred embodiment of the present invention.
Figure 12B:
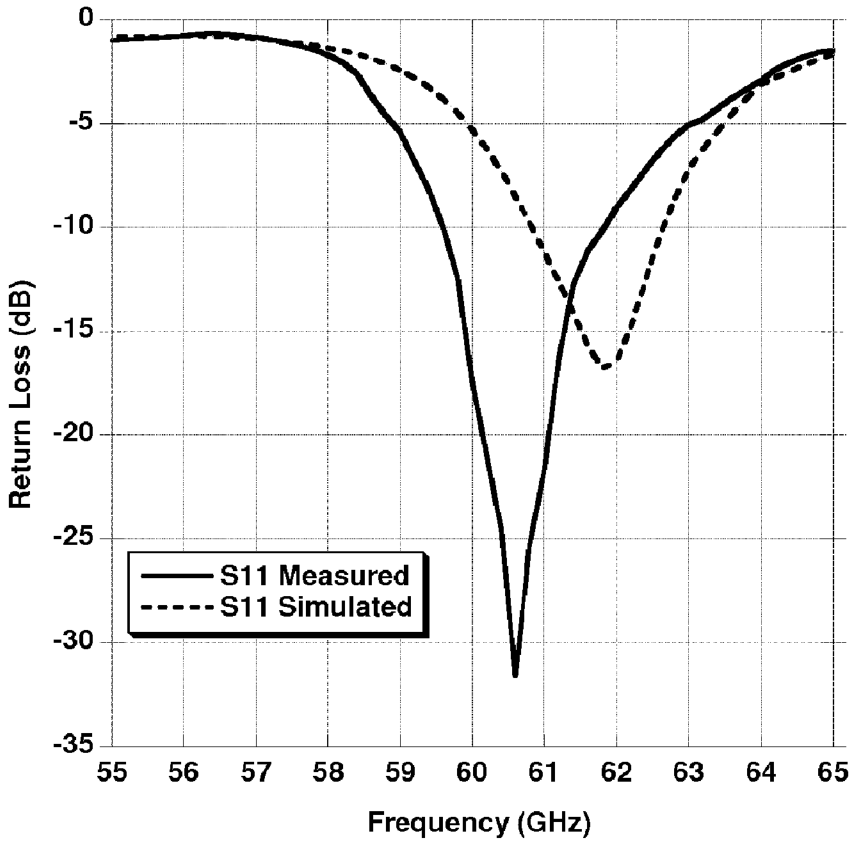
FIGS. 12B-12D depict graphical representations of the performance of the 1 by 2 circularly polarized antenna, in accordance with a preferred embodiment of the present invention.
Figure 12C:
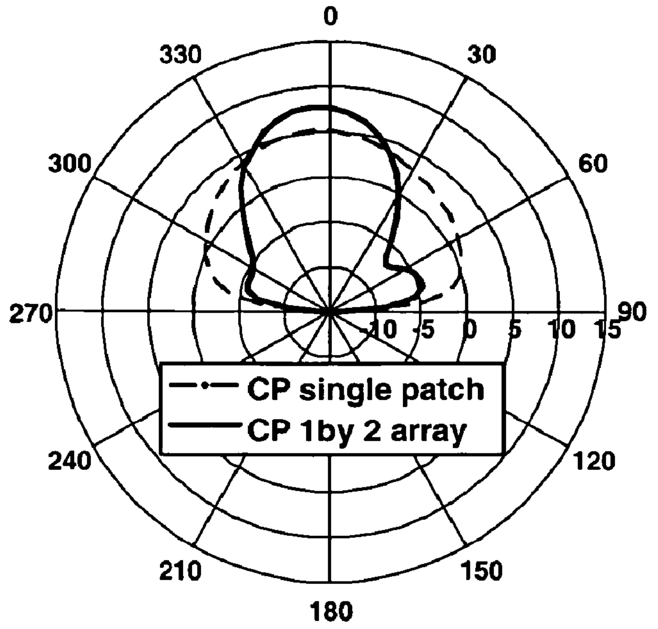
Figure 12D:
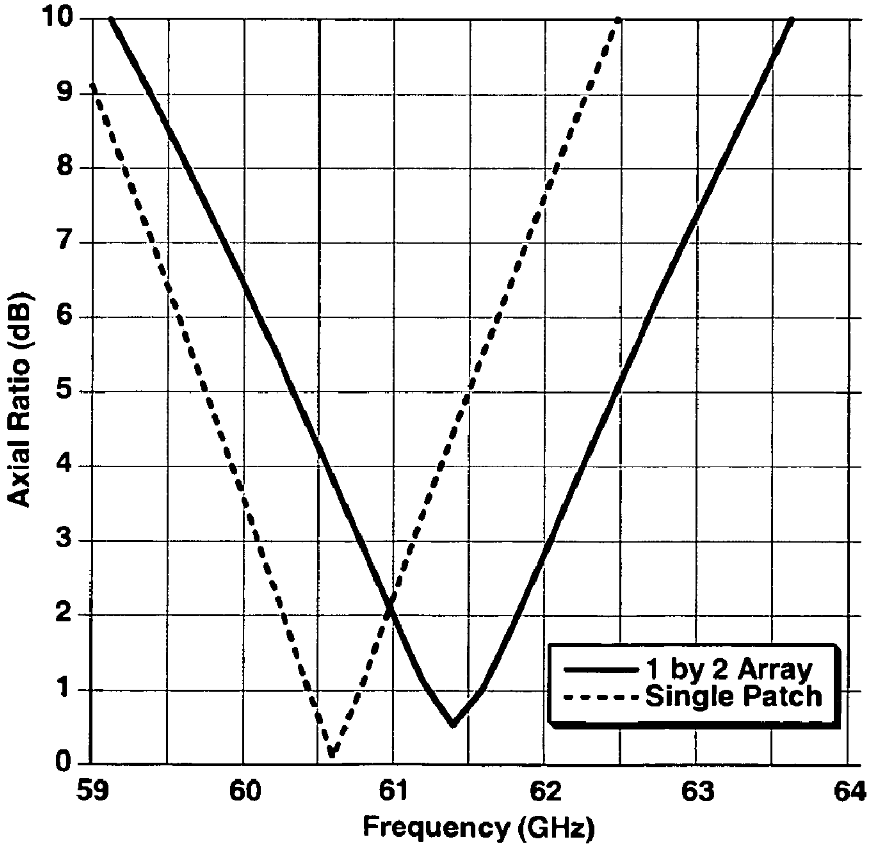

FIG. 12A illustrates a top view of a 1 by 2 array antenna 1200. FIG. 12B illustrates a graphical representation of the 1 by 2 array antenna 1200, wherein illustrating the measured and simulated results of return loss (dB) versus frequency (GHz). FIG. 12C illustrates a graphical representation of the radiation path of the 1 by 2 array antenna 1200. FIG. 12D illustrates a graphical representation of axial ration (dB) versus frequency (GHz).

Figure 13A:
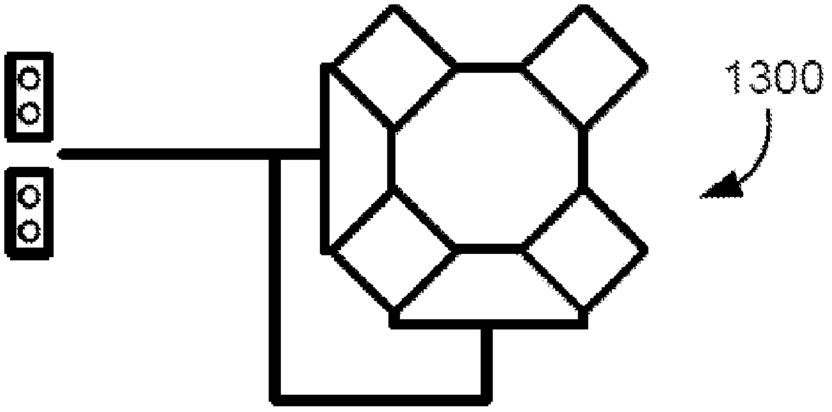
FIG. 13A depicts a top view of a 2 by 2 circularly polarized antenna, in accordance with a preferred embodiment of the present invention.
Figure 13B:
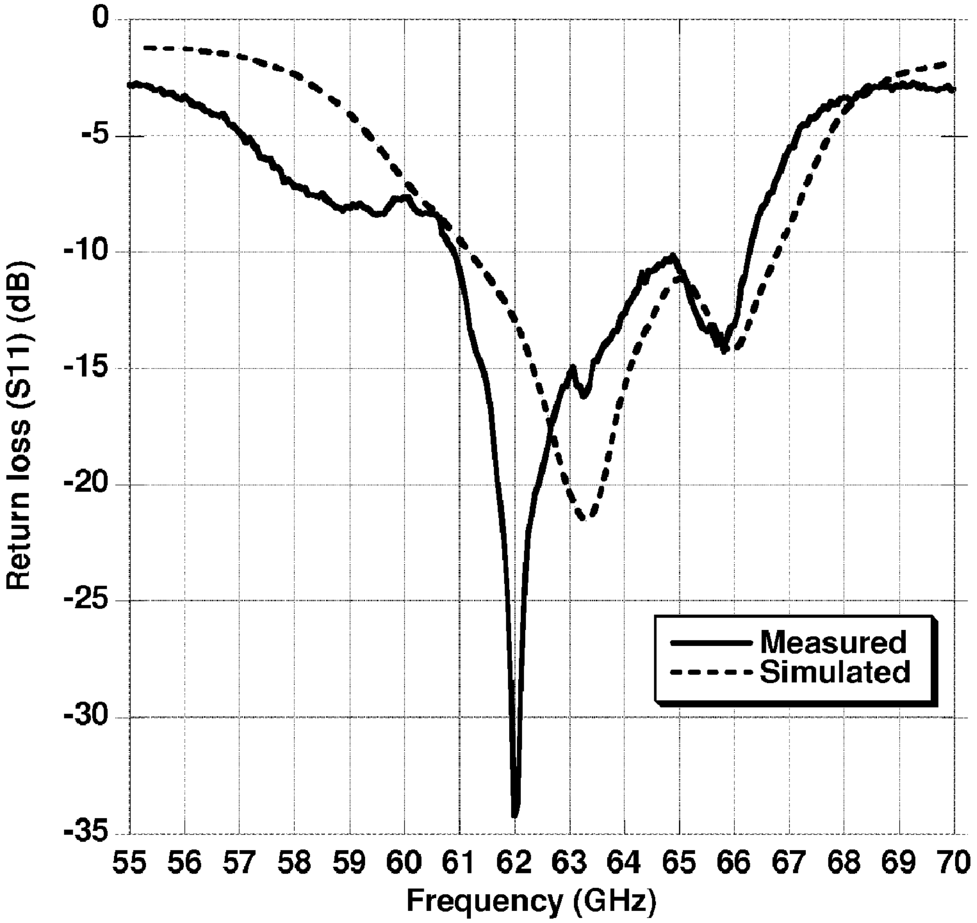
FIGS. 13B-13D depict graphical representations of the performance of the 2 by 2 circularly polarized antenna, in accordance with a preferred embodiment of the present invention.
Figure 13C:
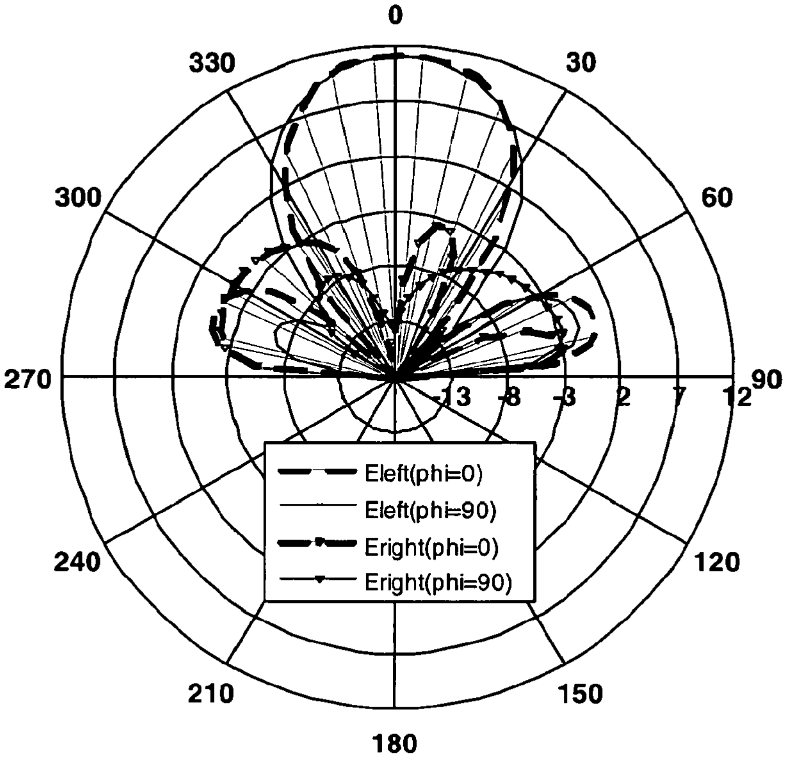
Figure 13D:
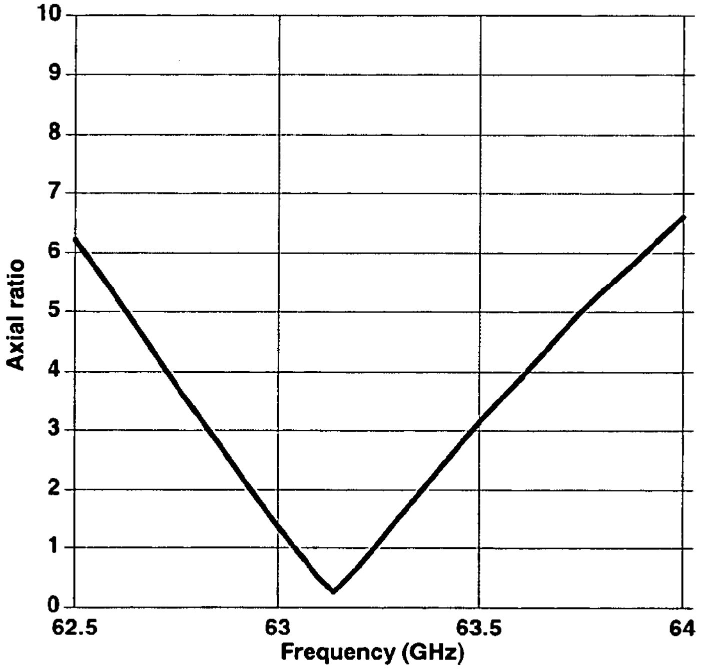

FIG. 13A illustrates a top view of a 2 by 2 array antenna 1300. FIG. 13B illustrates a graphical representation of the 2 by 2 array antenna 1300, wherein illustrating the measured and simulated results of return loss (dB) versus frequency (GHz). FIG. 13C illustrates a graphical representation of the radiation path of the 2 by 2 array antenna 1300. FIG. 13D illustrates a graphical representation of axial ration (dB) versus frequency (GHz).

Table II further summarizes FIGS. 12A-12D and 13A-13D.

TABLE II

Summary of Circularly Polarized Antennas Array Performances

| Antenna Topology | Gain (dBi) | 10 dB Bandwidth (GHz) | Beam-width Azimuth/Elevation (Deg.) | 3 dB Axial Ratio Bandwidth (GHz) |
|---|---|---|---|---|
| 1 by 2 | 9 | ~2 | 60/30 | 1 |
| 1 by 6 | 12 | 9 | 60/8 | 3.5 |
| 2 by 2 | 11 | ~5 | 40/40 | 0.75 |

Figure 14A:
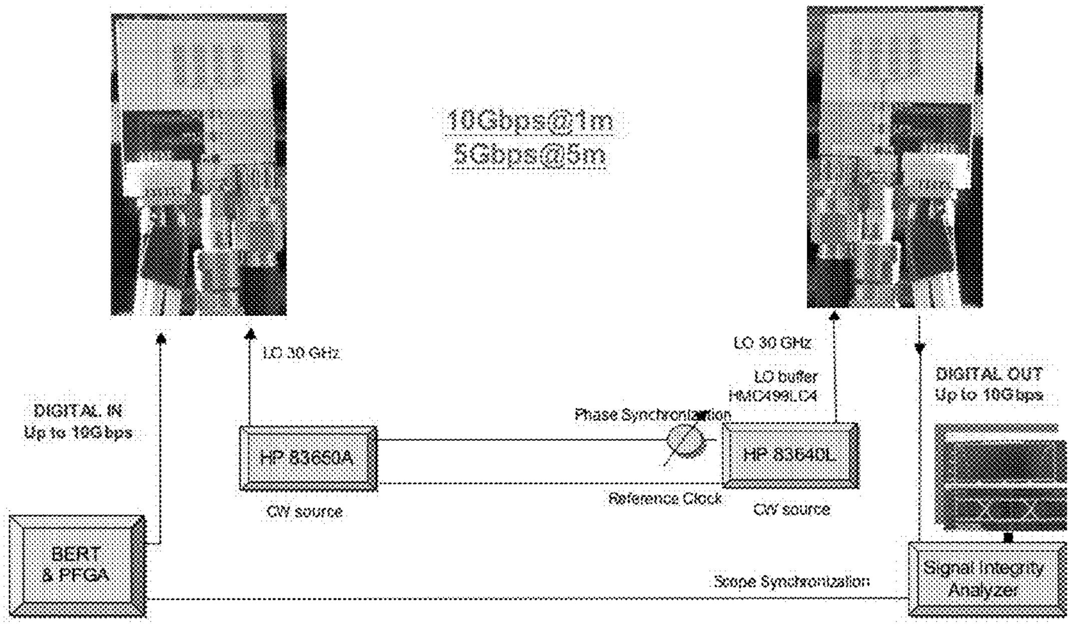
FIG. 14A depicts a top view of a test environment of a 60 GHz multi-gigabit link, in accordance with a preferred embodiment of the present invention.
Figure 14B:
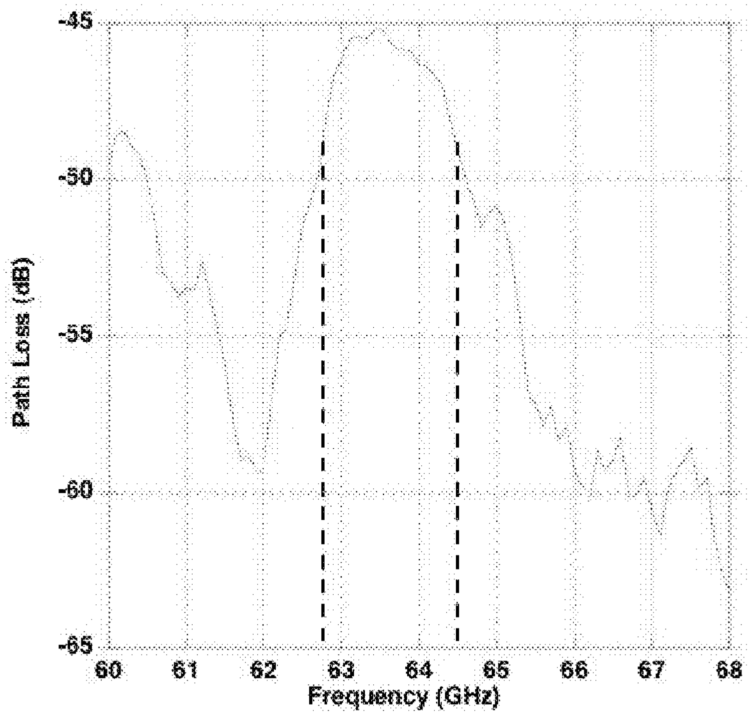
FIG. 14B depicts a measured power link of the test environment, in accordance with a preferred embodiment of the present invention.

FIG. 14A illustrates a test environment 1400 of performances of 60 GHz multi-gigabit links to validate exterior of channels. FIG. 14B illustrates the measured power link of the test environment 1400.

FIG. 14A depicts the test environment 1400 targeting a wireless data rate of approximately 2.5 Gb/s at a distance of approximately 3 to 5 meters. The approximately 60 GHz front-end module is implemented on a LCP substrate, using the building blocks described above. In a first phase, PHEMT (pseudomorphic high electron mobility transistor) commercial MMIC (monolithic microwave integrated circuit) can be used to validate the module integration concept. In a second phase, Silicon MMIC can be used.

FIG. 14A illustrates the operation of the test environment 1400. The bit error rate tester (BERT) 1405 provides a signal 1410 up to 2.5 Gb/s. This speed is preferably doubled, to 5 Gb/s using QPSK (Quadrature Phase Shift Keying) modulation, and quadrupled to 10 Gb/s using dual capacity QPSK modulation schemes. The signal 1410 can be filtered through a filter 1415. The signal then enters a first module 1420. A continuous wave signal generator 1425 is buffered into the first module 1420. Preferably, the continuous wave signal generator 1425 operates at 30 GHz and the use of sub-harmonic mixers enables 60 GHz mixing operations. The combined signal is transmitted from the first module 1420. A second module 1430, approximately 50 centimeters to 5 meters from the first module 1420, receives the transmitted signal 1435 from the first module 1420. The signal from the first module 1420 is transmitted to the second module 1430 at up to 10 Gb/s, depending on the modulation and the use or double capacity transmission scheme. The transmitted signal 1435 is then filtered through a filter 1440 and then transmitted to the BERT 1405. The second module 1430, in addition, has an attached signal generator 1445 that is synchronized with the signal generator 1425 of the first module 1420.

FIG. 14B illustrates a graphical representation of a path loss (dB) versus frequency (GHz) result of the test environment. A power link measurement, performed with a transmitter omni-directional antenna, and a receiver having a 4 by 4 pencil beam antenna array, is illustrated. An approximately 2 GHz wireless channel is clearly open, centered at approximately 63.5 GHz.

Figure 15:
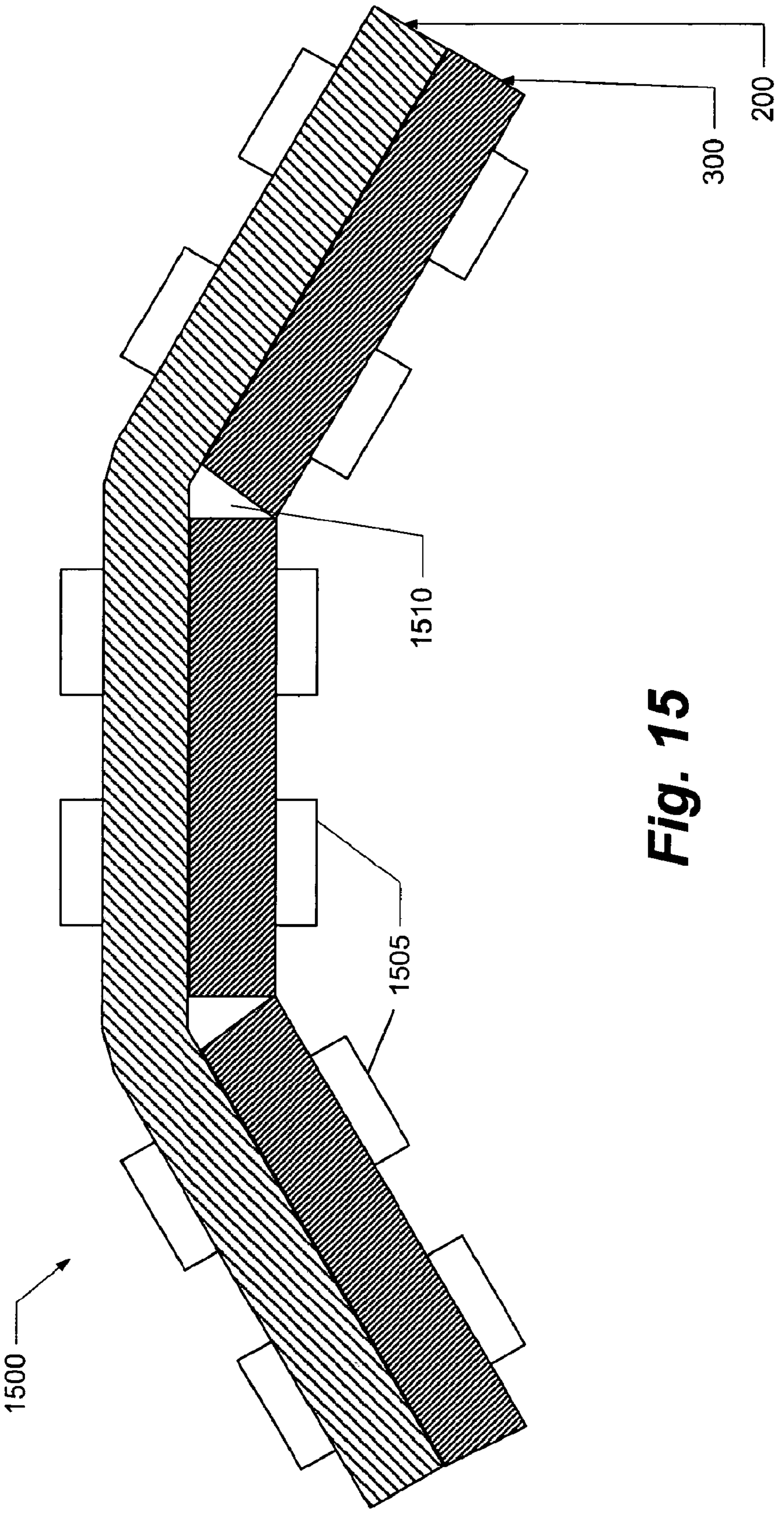
FIG. 15 depicts a side view of an multi-sector module, in accordance with a preferred embodiment of the present invention.

FIG. 15 illustrates a multi-sector module 1500, or an angled module, utilizing multiple angles to receive and/or transmit from the module. Active components 1505 are also illustrated on a surface of the multi-sector module 1500. As a result of the multi-sector module 1500 design, at least one trench 1510 can be implemented in the FR4 core substrate (the bottom layer 300), before the lamination of the LCP layers (the top layer 200). Thus, a portion of the FR4 bottom substrate 310 is partially omitted. The FR4 layer provides stability to the multi-sector module 1500. The mechanical property of the LCP (the top layer 200) enables flexibility and thus enables the bent (or angled) shape of the multi-sector module 1500. Thus, the LCP can function as a high performance, low loss flexible interconnect that enables the easy and low cost fabrication of the multi-sector conformal module 1500. One of the advantages of this approach is to minimize the assembly works of a multi-sector system, wherein each element would be built separately.

The multi-sector module 1500 can enable a plurality of sectors, or modules, to be configured to enable the module 1500 to receive signals from different angles. Thus, the typical module is improved to receive a number of signals from a number of angles.

Figure 16A:
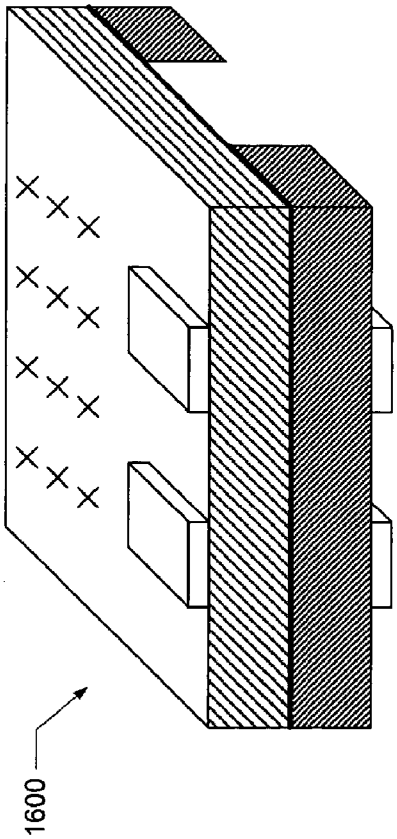
FIG. 16A depicts a perspective view an end-fire millimeter wave antenna, in accordance with a preferred embodiment of the present invention.
Figure 16B:
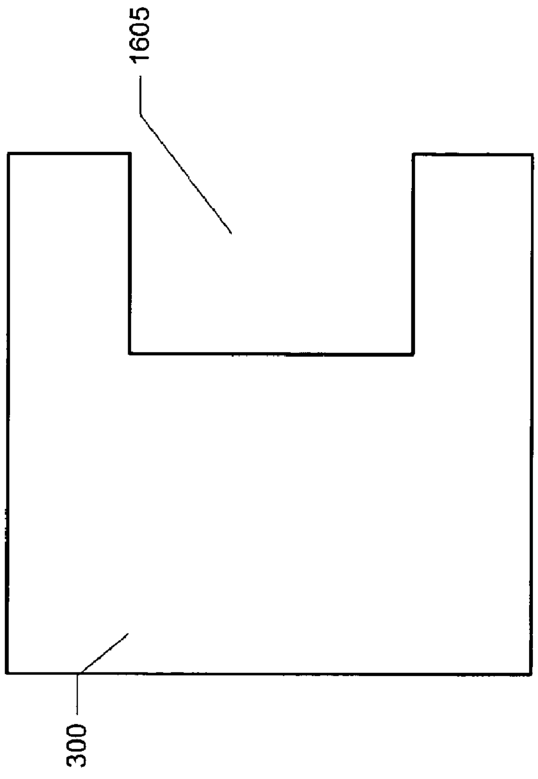
FIG. 16B depicts a top view of a bottom layer of the end-fire millimeter wave antenna, in accordance with a preferred embodiment of the present invention.

FIG. 16A illustrates an end-fire MMW antenna 1600. FIG. 16B illustrates a top view of the bottom layer 300. Referring to FIG. 16A, the bottom layer 300 defines a cavity 1605; this is defined in the FR4 core substrate (see FIG. 16B). The cavity 1605 of the bottom layer 300 is, preferably, created before the lamination of the top layer 200 (the LCP). Hence, the LCP can perform as a high performance low loss dielectric membrane. The end result can be an easy and low cost fabrication of end-fire Yagi antenna array.

Figure 17:
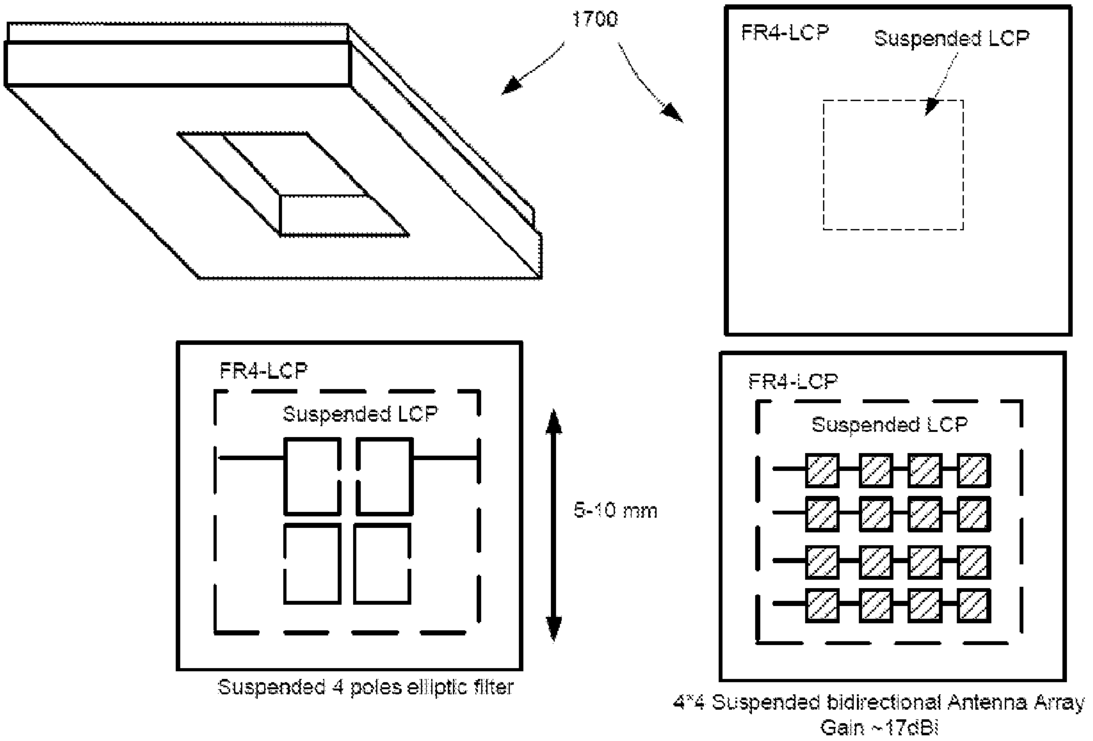
FIG. 17 depicts a module having the bottom layer defining a cavity, in accordance with a preferred embodiment of the present invention.

Another embodiment of the present invention is shown in FIG. 17. FIG. 17 illustrates a module 1700, wherein a cavity 1705 is centered in the bottom layer 300. Accordingly, the bottom layer 300 can have a defined cavity 1705. Preferably, the cavity 1705 is created before the lamination of the LCP layers (the top layer 200). Hence, the LCP can perform as a high performance, low loss dielectric membrane, which enables easy and low cost fabrication of the suspended filter and bi-directional patch antenna array.

Figure 18A:
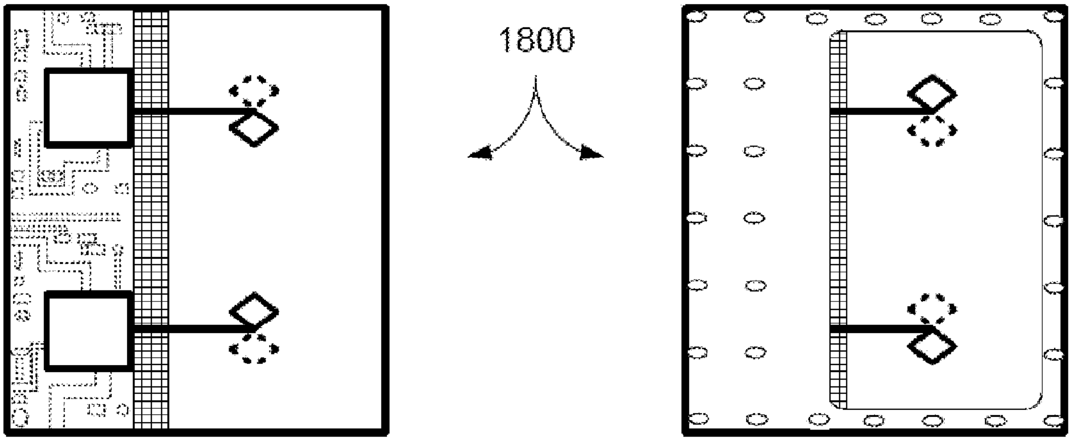
FIG. 18A depicts views of a 60 GHz radio module, in accordance with a preferred embodiment of the present invention.
Figure 18B:
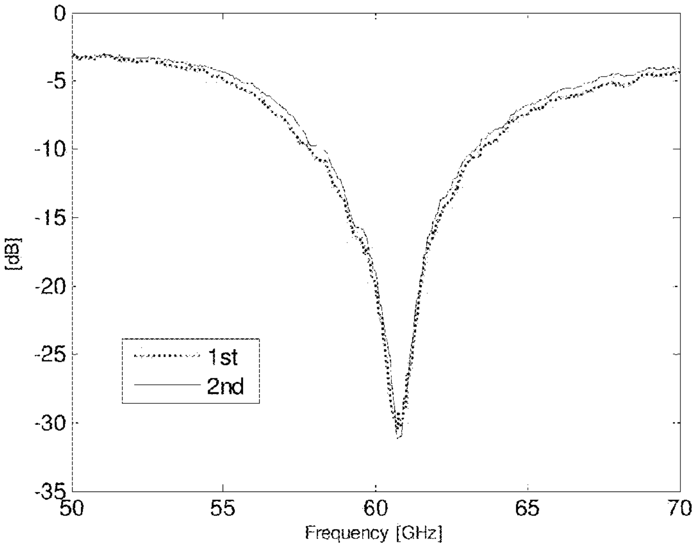
FIG. 18B depicts a graphical representation of the 60 GHz radio module, in accordance with a preferred embodiment of the present invention.

FIG. 18A illustrates a preferred topology for use as a 60 GHz radio module 1800 with integrated dual polarization, dual capacity antenna array for 10 Gb/s wireless link. FIG. 18B illustrates performance of the of the integrated dual polarization, dual capacity antenna array for 10 Gb/s wireless link.

Figure 19:
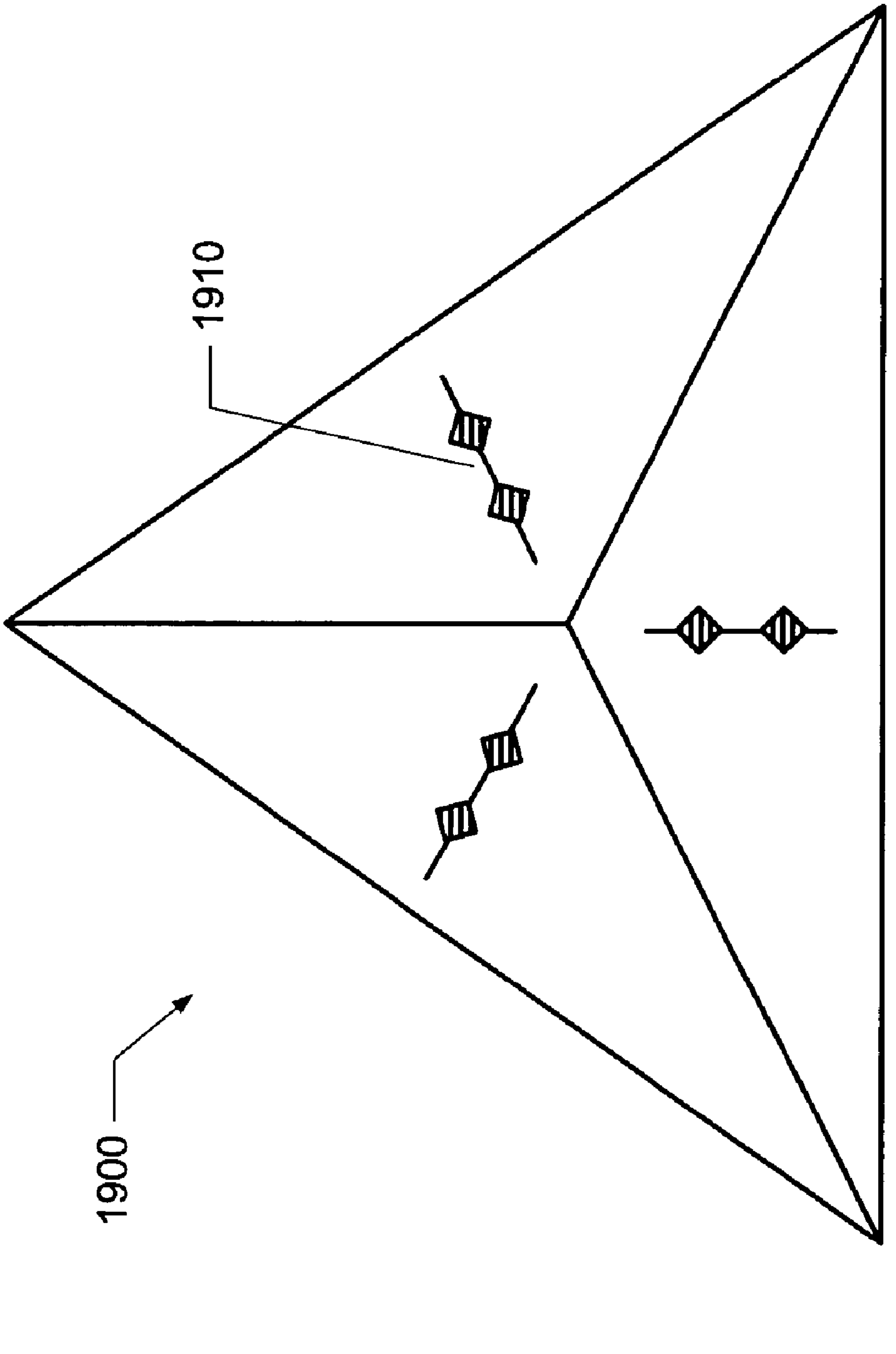
FIG. 19 depicts a pyramidal multi-sector antenna, in accordance with a preferred embodiment of the present invention.

FIG. 19 illustrates a pyramidal multi-sector antenna 1900 for a 60 GHz wireless docking station. The pyramidal antenna 1900 can cover 360 degrees in azimuth. Each sector support a low to medium gain, single patch antenna or a 1 by 2 patch antenna array 1910, depending on the required/desired coverage. Further, linear or circular polarization can be used. In a preferred embodiment, the dimension of the pyramidal antenna 1900 is compatible with its integration, in a 1.8 by 1.8 by 1.8 cubic centimeters volume.

While the invention has been disclosed in its preferred forms, it will be apparent to those skilled in the art that many modifications, additions, and deletions can be made therein without departing from the spirit and scope of the invention and its equivalents, as set forth in the following claims.

We claim:

1. A method of fabricating an ultra-high frequency module comprising:

providing a top layer being a high frequency substrate;

drilling the top layer to establish vertical vias in the top layer;

milling the top layer to define a top layer cavity for receiving a chipset;

providing a bottom layer comprising a reinforcement structure, the bottom layer having a double clad core and a bottom substrate;

adhering the double clad core and the bottom substrate of the bottom layer;

milling the bottom layer to define a bottom layer cavity;

aligning the top layer and the bottom layer; and adhering the top layer to the bottom layer.

2. The method of fabricating of claim 1, wherein the top layer comprises liquid crystal polymer, and the bottom layer comprises fire resistant 4.

3. The method of fabricating of claim 1, further comprising integrating a printed filter and a filtered antenna into the module.

4. The method of fabricating of claim 1, further comprising encapsulating the top layer and the bottom layer.

5. The method of fabricating of claim 1, further comprising fabricating the top layer and the bottom layer on a large area panel of a printed circuit board, wherein the large area panel is approximately 12 inches by 18 inches, or larger.

6. The method of fabricating of claim 1, wherein adhering the double clad core and the bottom substrate, and adhering the top layer to the bottom layer is performed with an adhesive.

7. The method of fabricating of claim 6, wherein the adhesive is a pressure sensitive adhesive enabling room-temperature lamination, a solid electrical connection between connections, and an accurate alignment of the top layer and the bottom layer.

* * * * *